(12) United States Patent
Ward

(10) Patent No.: US 11,595,499 B2
(45) Date of Patent: Feb. 28, 2023

(54) GRAPHICAL USER INTERFACE FOR GENERATING MULTIPLE TASKS

(71) Applicant: Cartocal, LLC, Ventura, CA (US)

(72) Inventor: Matthew Ward, Ventura, CA (US)

(73) Assignee: Cartocal, LLC, Ventura, CA (US)

( * ) Notice: Subject to any disclaimer, the term of this patent is extended or adjusted under 35 U.S.C. 154(b) by 0 days.

(21) Appl. No.: 17/527,095

(22) Filed: Nov. 15, 2021

(65) Prior Publication Data
US 2022/0078265 A1  Mar. 10, 2022

Related U.S. Application Data

(63) Continuation of application No. 16/727,643, filed on Dec. 26, 2019, now Pat. No. 11,178,253.

(60) Provisional application No. 62/791,670, filed on Jan. 11, 2019.

(51) Int. Cl.
| | |
|---|---|
| *H04L 29/08* | (2006.01) |
| *H04L 67/75* | (2022.01) |
| *H04L 67/306* | (2022.01) |
| *H04L 69/329* | (2022.01) |
| *H04L 9/40* | (2022.01) |
| *H04L 67/14* | (2022.01) |
| *H04L 67/01* | (2022.01) |
| *H04L 67/53* | (2022.01) |
| *G06Q 10/1093* | (2023.01) |

(52) U.S. Cl.
CPC .......... *H04L 67/75* (2022.05); *H04L 63/0815* (2013.01); *H04L 67/01* (2022.05); *H04L 67/14* (2013.01); *H04L 67/306* (2013.01); *H04L 67/53* (2022.05); *H04L 69/329* (2013.01); *G06Q 10/1093* (2013.01); *G06Q 10/1095* (2013.01)

(58) Field of Classification Search
CPC ......... H04L 67/36; H04L 67/14; H04L 67/20; H04L 67/42; H04L 67/329; G06Q 10/1093; G06Q 10/1095
USPC .......................................................... 709/203
See application file for complete search history.

(56) References Cited

U.S. PATENT DOCUMENTS

| | | | |
|---|---|---|---|
| 7,188,073 B1 * | 3/2007 | Tam ....................... | G06Q 10/02 705/5 |
| 2006/0036478 A1 * | 2/2006 | Aleynikov ......... | G06Q 10/1095 705/7.19 |
| 2010/0057513 A1 * | 3/2010 | Carlson ................ | G06Q 10/109 705/7.19 |
| 2013/0282397 A1 * | 10/2013 | Easterhaus ............. | G16H 40/20 705/3 |
| 2014/0278450 A1 * | 9/2014 | Schoenberg ........... | G16H 10/60 705/2 |

(Continued)

*Primary Examiner* — Glenford J Madamba
(74) *Attorney, Agent, or Firm* — Cognition IP, P.C.; Edward Steakley

(57) ABSTRACT

Methods, systems, and devices are provided for generating a graphical user interface configured to display, at least in part, a schedule. According to one aspect, the system can receive selectable fields of a client and selectable fields one or more providers from a plurality of providers. The system can determine the quality of pairings between the client and each of the one or more providers based on the one or more selectable fields of the client and the one or more selectable fields of the one or more providers. The system can generate a schedule of potential sessions based on the pairings. The system can score each of the potential sessions and display the schedule and scores to a user.

17 Claims, 41 Drawing Sheets

(56) References Cited

U.S. PATENT DOCUMENTS

2019/0237203 A1\* 8/2019 Schwabl ............. G06F 21/6245
2020/0143938 A1\* 5/2020 Kakhki ................. G06Q 10/02

\* cited by examiner

QUERY TYPE SELECTOR 140

QUERY FIELD 130

○ SCHEDULER  ○ SESSION LIST  ○ SESSION DATA

QUERY TYPE: THERAPIST QUITTING

☐ MONDAY  ☐ TUESD...  ☐ WEDN...  ☐ THURS...  ☐ FRIDAY  ☐ SATURD...

START TIME: 8:00  END TIME: 8:00

LOCATION: 936035-OXNARD

DIVISION: ALL DIVISIONS

| | LANGUAGES | | CERTIFICATIONS |
|---|---|---|---|
| MIN PRT | SELECT | ENGLISH ☐ | BCBA ☐ |
| | | SPANISH ☐ | BCaBAc ☐ |
| MIN DTT | SELECT | ARABIC ☐ | QASP ☐ |
| | | MANDARIN ☐ | BMA ☐ |
| MIN PBS | SELECT | FRENCH ☐ | RBT ☐ |
| | | | ABAT ☐ |

MALE/FEMALE REQUIRED

THERAPIST SELECT: THER... IENT10

UPDATED HEALTHCARE PROVIDER LIST 144

EXECUTE QUERY

| | CLIENT NAME |
|---|---|
| 1 | CLIENT4 |
| 2 | CLIENT9 |
| 3 | CLIENT7 |

CLIENT NAMES 142

| | VALID THERAPIST | THERAPIST'S HOURS WITH CASE | YEARLY COST |
|---|---|---|---|
| 1 | THERAPIST6 | 10 | 0 |
| 2 | THERAPIST17 | 11.5000 | 0 |
| 3 | THERAPIST18 | 11.6000 | 150 |
| 4 | THERAPIST19 | 11.6000 | 150 |
| 5 | THERAPIST5 | 16 | 0 |
| 6 | THERAPIST11 | 19.7000 | 850 |
| 7 | THERAPIST8 | 20 | 0 |
| 8 | THERAPIST20 | 20 | 0 |
| 9 | THERAPIST21 | 21.7000 | 2131 |
| 10 | THERAPIST1 | 29.4000 | 198 |
| 11 | THERAPIST22 | 39.5000 | 0 |
| 12 | THERAPIST14 | 39.7000 | 0 |
| 13 | THERAPIST23 | 41 | 0 |

FROM FIG. 1E

FIG. 2A

OPTIMIZATION GUI 200

RULE SELECTOR 210

OPTIMIZATION TABLE 220

TARGET METRIC 212

CLIENT AVAILABILITY GRAPH 226

HEALTHCARE PROVIDER AVAILABILITY GRAPH 236

TO FIG. 2A (CONT'D)

○ DATA FOCUS  ○ SUPERVISOR  ○ OPERATION  ○ SCHEDULER

DATA | REPORTS

SETTINGS — ALGORITHM TYPE: BANG FOR THE BUCK-THERAPIST FOCUS

METHOD DESCRIPTION: SWAPS CLIENTS AND THERAPISTS TO SAVE MONEY WHILE ATTEMPTING TO MAINTAIN THE NUMBER OF DIRECT HOURS THE THERAPISTS WORK. VALID SWAPS ARE ALLOWED UNDER CERTAIN PARAMETERS.

TARGET METRIC: DRIVING COST - TYPE 1
SIMILARITY TYPE: 3 - TOTAL HOURS
SIMILARITY THRESHOLD: 1.5

ALL DIVISIONS, DIVISION 1, DIVISION 2, DIVISION 3

[GENERATE RESULTS]

● SELECTED SWAPS  ○ ALL SWAPS   CURRENT EST. WKLY COST: $1523   [IMPLEMENT CHANGE]

| | C1-T1 | C2-T2 | T1 HRS W/CHANGE | T2 HRS W/CHANGE | WEEKLY SAV... | YEARLY SAV... | ALG TYPE |
|---|---|---|---|---|---|---|---|
| 1 | C5-T38 | C15-T30 | 8(+0) | 28(-3.5) | -69.53(-4.57%) | -3476.5 | 1 |
| 2 | C6-T24 | C16-T31 | 22.2(-2.1) | 41(-0.8) | -63.26(-4.15%) | -3163 | 1 |
| 3 | C7-T25 | C17-T32 | 37.3(+0.5) | 18.7(-2.8) | -54.16(-3.56%) | -2708 | 1 |
| 4 | C8-T26 | C18-T8 | 18(-2.2) | 10(+0) | -52.9(-3.47%) | -2645 | 1 |
| 5 | C9-T20 | C19-T33 | 9(-1) | 22.4(-0.5) | -37.41(-2.46%) | -1870.5 | 1 |
| 6 | C10-T27 | C20-T34 | 10(+0) | 33.3(-1.7) | -37.1(-2.44%) | -1855 | 1 |
| 7 | C11-T28 | C21-T35 | 24.1(+0.9) | 32.9(-2.6) | -36.91(-2.42%) | -1845.5 | 1 |
| 8 | C12-T12 | C22-T36 | 7.5(-0.5) | 23.6(-1) | -27.32(-1.79%) | -1366 | 1 |
| 9 | C13-T29 | C23-T4 | 36.6(-1) | 9.8(-0.5) | -13.1(-0.86%) | -655 | 1 |
| 10 | C14-T21 | C24-T37 | 10.6(+0) | 14(-0.3) | -8.54(-0.56%) | -427 | 1 |

SCHEDULE FOR CLIENT 5 (MON TUES WED THUR FRI SAT, 8:00–8:00)

SCHEDULE FOR THERAPIST 38 (MON TUES WED THUR FRI SAT, 8:00–8:00)

FIG. 2B

OPTIMIZATION GUI 200

DATA | REPORTS
● DATA FOCUS

SETTINGS

| ALGORITHM TYPE | BANG FOR THE BUCK-THERAPIST FOCUS ▽ |
|---|---|
| METHOD DESCRIPTION: | SWAPS CLIENTS AND THERAPISTS TO SAVE MONEY WHILE ATTEMPTING TO MAINTAIN THE NUMBER OF DIRECT HOURS THE THERAPISTS WORK. VALID SWAPS ARE ALLOWED UNDER CERTAIN PARAMETERS. |
| TARGET METRIC | DRIVING COST -TYPE 1 ▽ |
| SIMILARITY TYPE | 3 - TOTAL HOURS ▽ |
| SIMILARITY THRESHOLD (HOURS) | 1.5 |

| | |
|---|---|
| ALL DIVISIONS | ☑ |
| DIVISION1 | ☐ |
| DIVISION2 | ☐ |
| DIVISION3 | ☐ |

[GENERATE RESULTS]

RULE SELECTOR 210

TARGET METRIC 212

OPTIMIZATION TABLE 220

○ SUPERVISOR   ○ OPERATION   ○ SCHEDULER

● SELECTED SWAPS   ○ ALL SWAPS

CURRENT EST. WKLY COST  $1523    [IMPLEMENT CHANGE]

| | C1-T1 | C2-T2 | T1 HRS W/CHANGE | T2 HRS W/CHANGE | WEEKLY SAV. | YEARLY SAV. | ALG TYPE |
|---|---|---|---|---|---|---|---|
| 1 | C5-T38 | | 8(+0) | 28(-3.5) | -69.53(-4.57%) | -3476.5 | 1 |
| 2 | C6-T24 | C15-T30 | 22.2(-2.1) | 41(-0.8) | -63.26(-4.15%) | -3163 | 1 |
| 3 | C7-T25 | C16-T31 | 37.3(+0.5) | 18.7(-2.8) | -54.16(-3.56%) | -2708 | 1 |
| 4 | C8-T26 | C17-T32 | 18(-2.2) | 10(+0) | -52.9(-3.47%) | -2645 | 1 |
| 5 | C9-T20 | C18-T8 | 9(-1) | 22.4(-0.5) | -37.41(-2.46%) | -1870.5 | 1 |
| 6 | C10-T27 | C19-T33 | 10(+0) | 33.3(-1.7) | -37.1(-2.44%) | -1855 | 1 |
| 7 | C11-T28 | C20-T34 | 24.1(+0.9) | 32.9(-2.6) | -36.91(-2.42%) | -1845.5 | 1 |
| 8 | C12-T12 | C21-T35 | 7.5(-0.5) | 23.6(-1) | -27.32(-1.79%) | -1366 | 1 |
| 9 | C13-T29 | C22-T36 | 36.6(-1) | 9.8(-0.5) | -13.1(-0.86%) | -655 | 1 |
| 10 | C14-T21 | C23-T4 | 10.6(+0) | 14(-0.3) | -8.54(-0.56%) | -427 | 1 |
| | | C24-T37 | | | | | |

SCHEDULE FOR CLIENT5

(bar chart 8:00–8:00, MON TUES WED THUR FRI SAT, with codes 93003, 93041, 93060)

HEALTHCARE PROVIDER AVAILABILITY GRAPH 236

SCHEDULE FOR THERAPIST38

(bar chart 8:00–8:00, MON TUES WED THUR FRI SAT, with codes 93003, 93010, 93012, 93023, 93041, 93060)

CLIENT AVAILABILITY GRAPH 226

TO FIG. 2B (CONT'D)

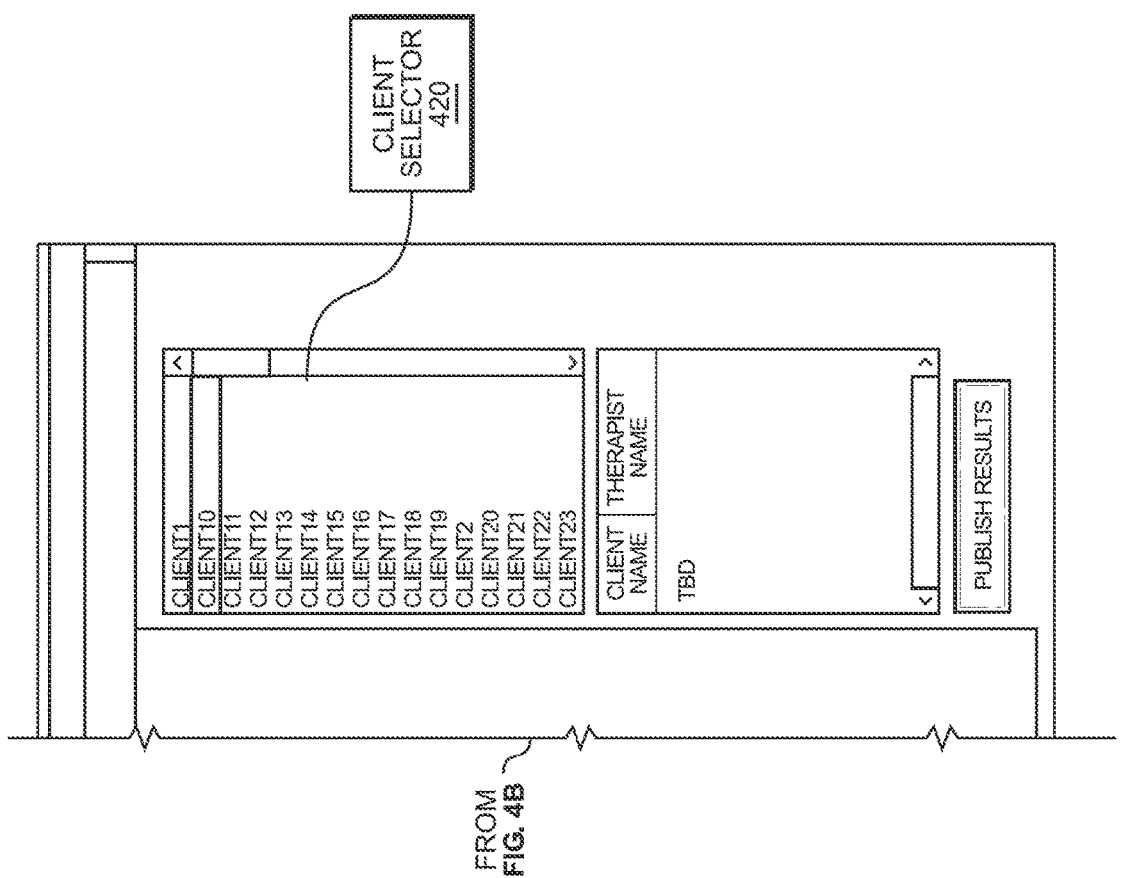

FIG. 4D

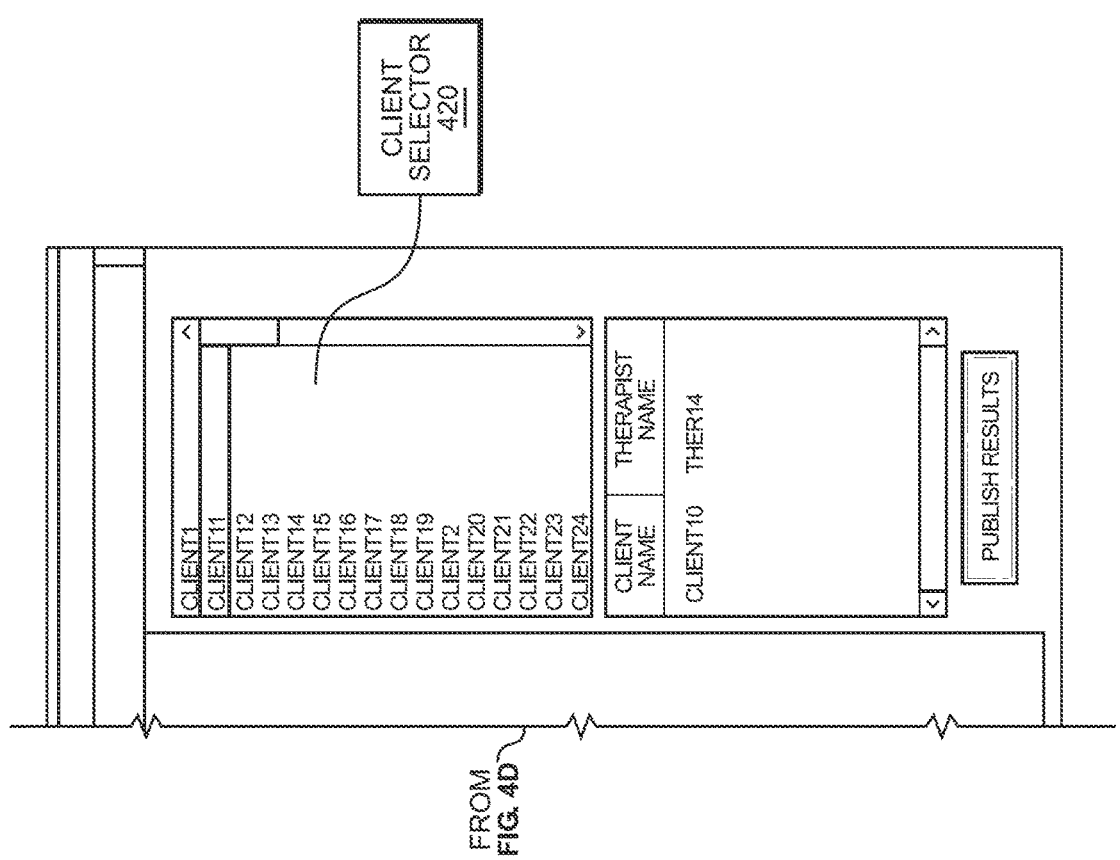

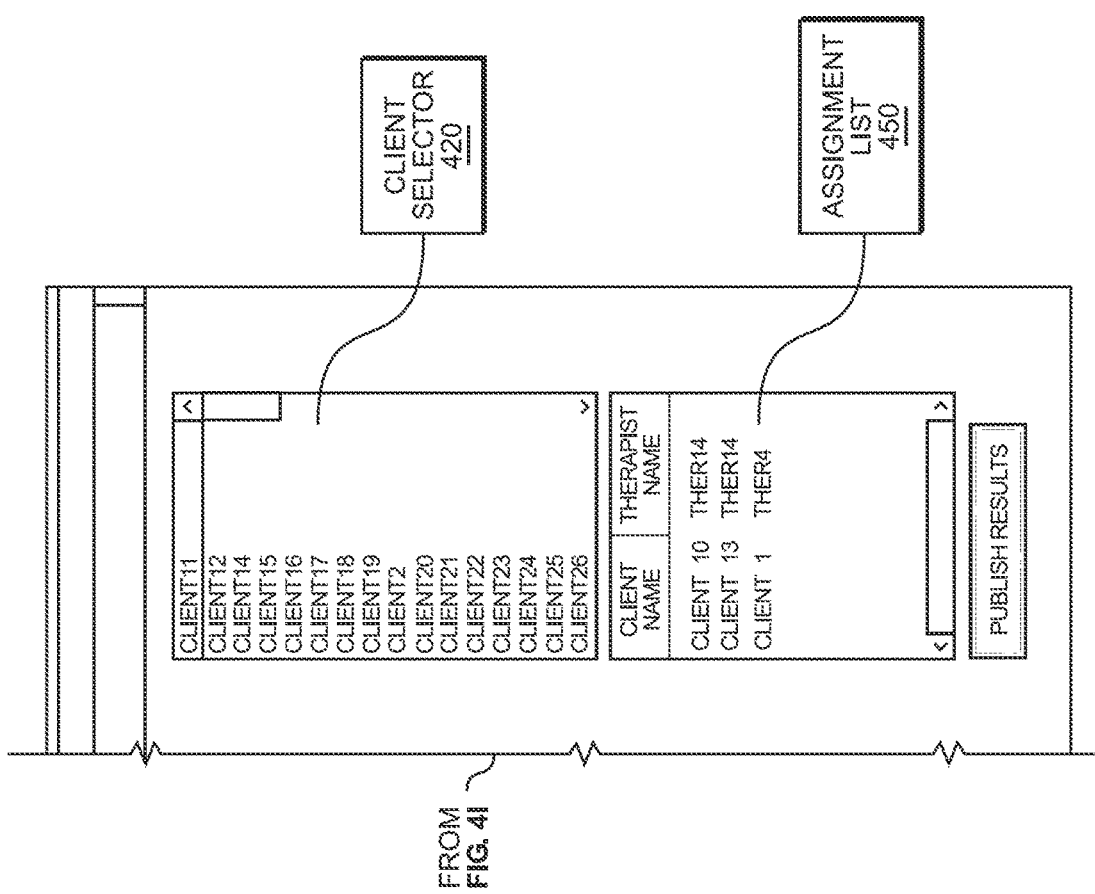

FIG. 5A

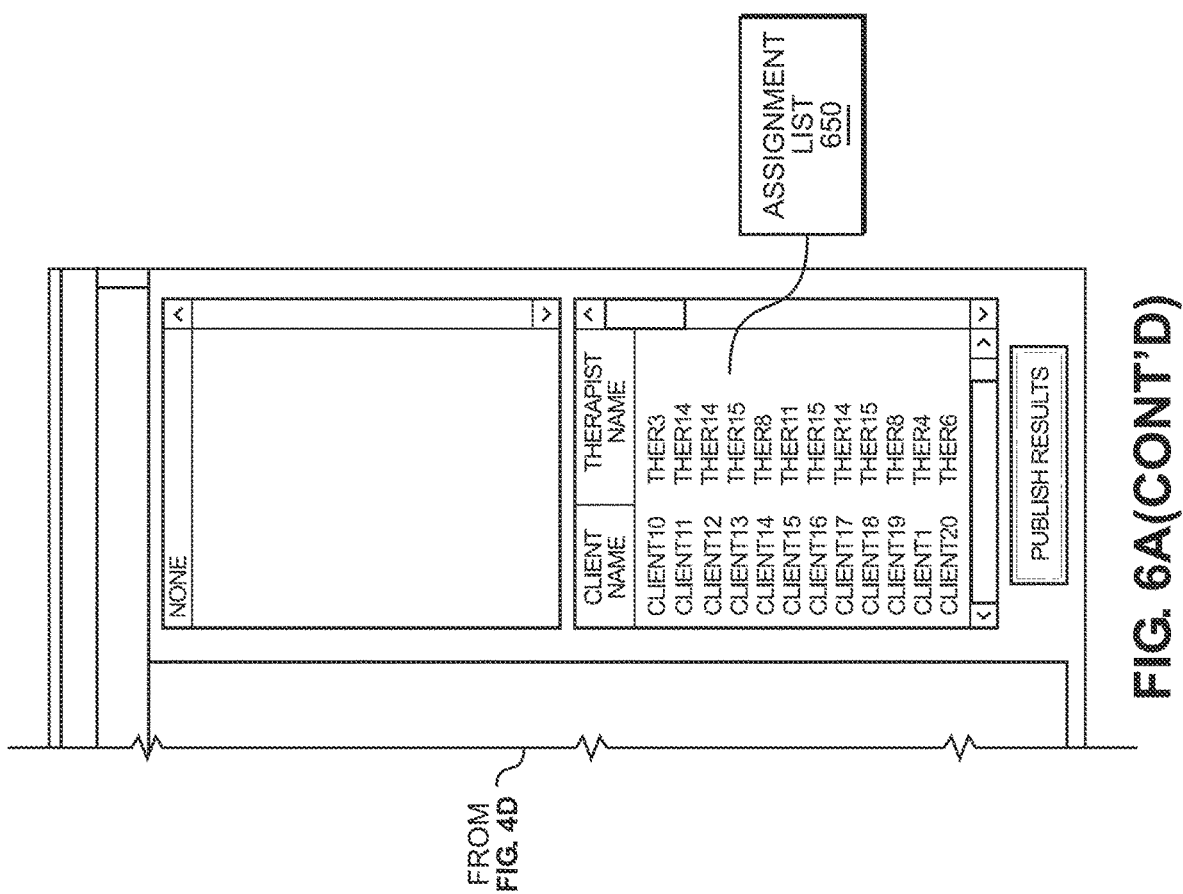

| CLIENT NAME | THERAPIST NAME |
|---|---|
| CLIENT10 | THER3 |
| CLIENT11 | THER14 |
| CLIENT12 | THER14 |
| CLIENT13 | THER15 |
| CLIENT14 | THER8 |
| CLIENT15 | THER11 |
| CLIENT16 | THER15 |
| CLIENT17 | THER14 |
| CLIENT18 | THER15 |
| CLIENT19 | THER8 |
| CLIENT1 | THER4 |
| CLIENT20 | THER6 |

NONE

PUBLISH RESULTS

FROM FIG. 6B

FIG. 6B(CONT'D)

GRAPHICAL USER INTERFACE FOR GENERATING MULTIPLE TASKS

CROSS-REFERENCE TO RELATED APPLICATIONS

This application is a continuation of U.S. application Ser. No. 16/727,643, filed Dec. 26, 2019, which claims the benefit of U.S. Provisional Application No. 62/791,670, filed Jan. 11, 2019, which is hereby incorporated by reference in its entirety.

BACKGROUND

Across many industries, entities or individuals have the task of geographically assigning a remote party or a network of parties to provide services or fulfil certain requirements from the entities' clients. For example, a business may concurrently have multiple clients that need requirements met or services fulfilled as well as provide a network of individuals or resources to service each of the clients' needs.

For example, a plumbing business may have a network of plumbers, often remote, dispersed across a geographic region ready to be assigned work in individuals' homes. The plumbing business may also have a network of clients who need servicing in the clients' homes. The plumbing business may allocate their network of remote plumbers to their clients with appointments between an individual plumber and a client. Each remote plumber can then travel to each individual's home based on the appointment set. In another example, medical care professionals perform services directly to the client at their home. A healthcare entity that works in such an industry may employ or contract a network of medical care professionals to service their patients across a geographic area. The medical care professionals will be based out of their homes and travel directly to the location of the client for an appointment.

Generally, making assignments or appointments between each resource, such as a service provider, and each requirement, such as a client, is a dynamic process that is influenced by a number of factors such as travel time of each service provider, preferred or required appointment time of each client, and more. These influences produce a cognitive load on an entity creating a schedule of appointments between the resources and requirements.

Currently, businesses and entities that are tasked with creating these types of dynamic schedules with a network of resources (providers) and requirements (clients) are done manually. When the schedules are being created, efficiency of maximizing a provider's substantive work time can be lost when attempting to satisfy each condition and requirements of clients. Thus, determining a schedule that satisfies conditions and requirements from clients can be greatly optimized.

BRIEF SUMMARY

The present disclosure relates generally to systems and methods for generating a schedule. In one aspect, a method to generate the schedule can include receiving one or more selectable fields of a client, receiving one or more selectable fields of one or more providers from a plurality of providers, determining pairings between the client and each of the one or more providers based on the one or more selectable fields of the client and the one or more selectable fields of the one or more providers from the plurality of providers, generating a schedule of one or more potential sessions between the client and a first provider from the plurality of providers based on the pairings, and displaying the schedule on a graphical user interface.

In one aspect, the method can include generating a schedule of one or more potential sessions between the client and a second or more providers from the plurality of providers based on the pairings. In one aspect, the method can include receiving the one or more selectable fields of the client includes receiving inputs from a user of the graphical interface, receiving selections of the one or more selectable fields from the user, or receiving client data from a remote server. In one aspect, the one or more selectable fields of the client can include rules or requirements of the client. In one aspect, the one or more selectable fields of the client can include availability windows of the client. In one aspect, the one or more selectable fields of the first provider can include availability windows of the first provider. In one aspect, the one or more selectable fields of the one or more providers can include credentials of the one or more providers.

In one aspect, the method can include generating the schedule, at least in part, based on calculating travel time and distance for each of the providers from the plurality of providers to the client.

In one aspect, the method can include displaying a score associated with each of the one or more potential sessions between the client and the first and second or more providers.

In one aspect, the method can include receiving selectable fields of a plurality of clients, receiving selectable fields of a plurality of providers, determining pairings among each client of the plurality of clients and each provider among the plurality of providers based on the selectable fields of the plurality of clients and selectable fields of the plurality of providers, and generating a schedule comprising one or more potential sessions between each client with one or more providers from the plurality of providers based on the pairings.

In one aspect, the method can include optimizing the schedule based on a metric and within a set of constraints, wherein the metric may comprise revenue or profit of the providers and the constraints may comprise provider availability or hours authorized by a third party.

In one aspect, a system can include one or more processors configured to perform acts including receive one or more selectable fields of a client, receive one or more selectable fields of one or more providers from a plurality of providers, determine pairings between the client and each of the one or more providers based on the one or more selectable fields of the client and the one or more selectable fields of the one or more providers from the plurality of providers, generate a schedule of one or more potential sessions between the client and a first provider from the plurality of providers based on the pairings, and display the schedule on a graphical user interface.

In one aspect, the one or more processors can generate a schedule of one or more potential sessions between the client and a second or more providers from the plurality of providers based on the pairings. In one aspect, the one or more processors can receive the one or more selectable fields of the client includes receiving inputs from a user of the graphical interface, receive selections of the one or more selectable fields from the user, or receive client data from a remote server. In one aspect, the one or more selectable fields of the client can include rules or requirements of the client. In one aspect, the one or more selectable fields of the client can include availability windows of the client. In one aspect, the one or more selectable fields of the first provider can include availability windows of the first provider. In one aspect, the one or more selectable fields of the one or more providers can include credentials of the one or more providers.

In one aspect, the one or more processors can generate the schedule, at least in part, based on calculating travel time and distance for each of the providers from the plurality of providers to the client.

In one aspect, the one or more processors can display a score associated with each of the one or more potential sessions between the client and the first and second or more providers.

In one aspect, the one or more processors can receive selectable fields of a plurality of clients, receive selectable fields of a plurality of providers, determine pairings among each client of the plurality of clients and each provider among the plurality of providers based on the selectable fields of the plurality of clients and selectable fields of the plurality of providers, and generate a schedule comprising one or more potential sessions between each client with one or more providers from the plurality of providers based on the pairings.

Other embodiments are directed to systems and computer readable media associated with methods described herein.

A better understanding of the nature and advantages of embodiments of the present invention may be gained with reference to the following detailed description and the accompanying drawings.

BRIEF DESCRIPTION OF THE DRAWINGS

Illustrative embodiments are described with reference to the following figures.

FIGS. 1B-1E show additional diagrams illustrating the graphical user interface that can be displayed on a display device for scheduling an appointment according to FIG. 1A.

FIGS. 4A-4I show additional diagrams illustrating a graphical user interface that can be displayed on a display device for generating a schedule according to some embodiments of the invention.

FIGS. 5A-5C show diagrams illustrating a graphical user interface that can be displayed on a display device for automatically generating a schedule according to some embodiments of the invention.

DETAILED DESCRIPTION

Figure 1A:
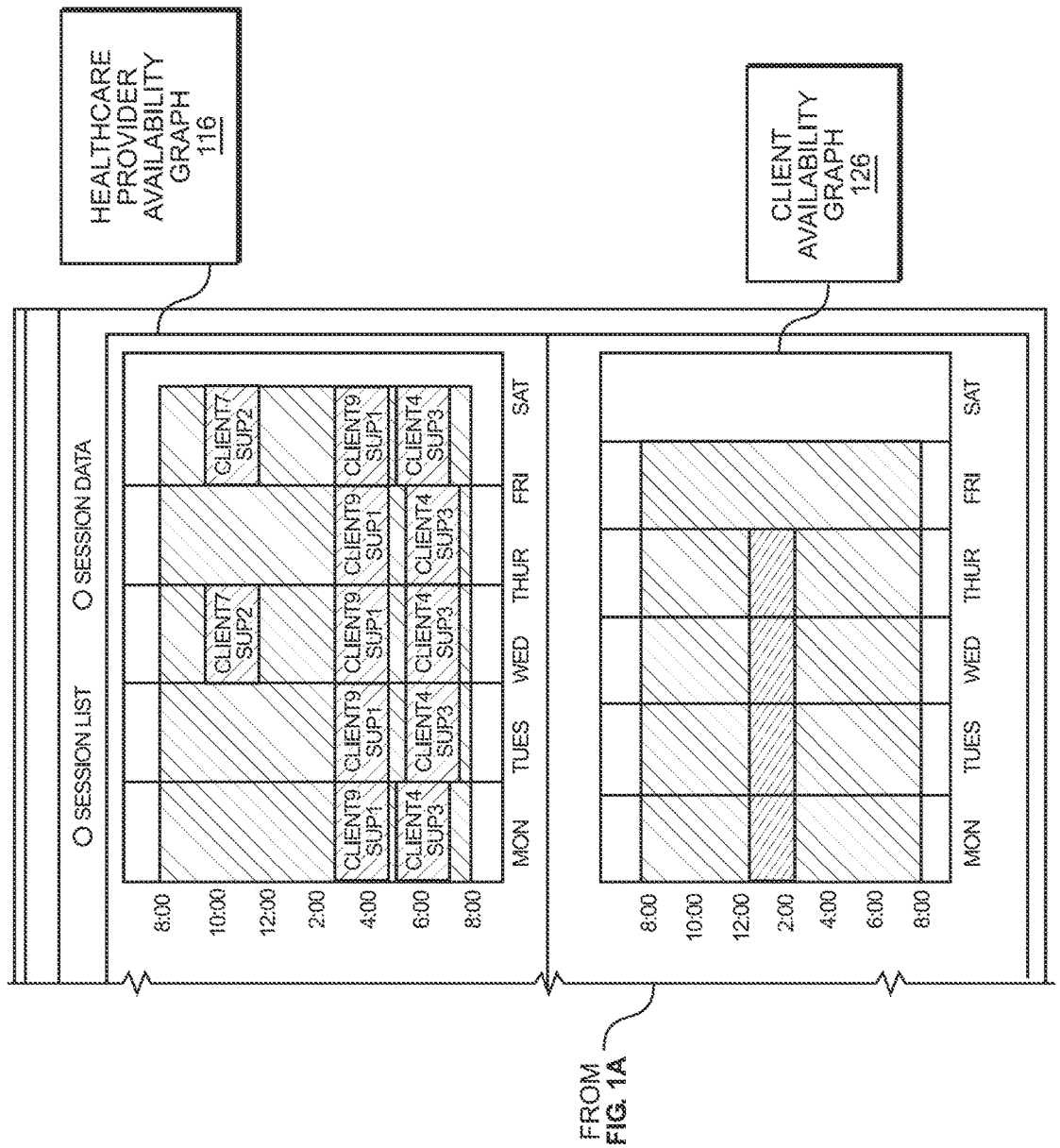
FIG. 1A shows a diagram illustrating a graphical user interface that can be displayed on a display device for scheduling an appointment according to some embodiments of the invention.

According to certain embodiments, methods and systems disclosed herein relate to a schedule generator.

In this specification, reference is made in detail to specific embodiments of the invention. Some of the embodiments or their aspects are illustrated in the figures. For clarity in explanation, the system has been described with reference to specific embodiments, however it should be understood that the system is not limited to the described embodiments. On the contrary, the system covers alternatives, modifications, and equivalents as may be included within its scope as defined by any patent claims. The following embodiments of the system are set forth without any loss of generality to, and without imposing limitations on, the claimed method. In the following description, specific details are set forth in order to provide a thorough understanding of the present method. The present method may be practiced without some or all of these specific details. In addition, well known features may not have been described in detail to avoid unnecessarily obscuring the system.

In addition, it should be understood that steps of the exemplary system and method set forth in this exemplary patent can be performed in different orders than the order presented in this specification. Furthermore, some steps of the exemplary system and method may be performed in parallel rather than being performed sequentially.

When forming a schedule including appointments between a group of service providers or resources and a group of clients, there is very little done to holistically plan out the schedule. In some industries, such as in healthcare, a healthcare entity will employ or contract a number of healthcare providers, also known as resources to service the healthcare entity's clients. Generally, the healthcare entity will consider multiple parameters in deciding which healthcare provider will be paired with a particular client and the appointment time in the schedule. The factors usually include availabilities of the healthcare providers and availabilities of the clients in a given period of time. Other factors can include the total travel time a particular healthcare provider will accumulate for meeting with a particular client, whether the client has specific needs such that only a few healthcare providers can service or treat the client, and many other criteria.

Currently, a person who is tasked with making a schedule for a given period of time will have to manually decide on the appointments while making sure all of the criteria are met and not in conflict. Determining such a schedule, especially when there are many available providers and many clients, that satisfies the conditions and requirements of each party is difficult to track since the resources (service providers) have varying availabilities, credentials, skill levels and specializations. On top of these factors, healthcare entities are motivated to save time and reduce capital expenditures on labor by increasing the efficiency of their employees and contractors. For example, between two healthcare providers whom can each meet a particular client for an appointment and satisfy all the criteria for the appointment, the healthcare entity would prefer to set an appointment with the healthcare provider that accrues the fewer amount of travel time or cost. Additionally, a healthcare entity would tend to prefer to set a group of appointments such that they can schedule as many billable hours as possible. Thus, a system that can aid a healthcare entity and/or its scheduler in creating a schedule that can account for all of the various criteria that need to be met for pairing service providers and clients as well as optimize the cost efficiency would greatly benefit the industry.

The following specification describes an example of a system and method of generating and configuring a schedule. The schedule generator can include a graphical user interface (GUI) where selectable actions can generate appointments, or sessions, between a provider and a client. The GUI can also display potential pairings for the user to finalize and also display visual indicators for the quality of the pairings derived from accounting for various factors. In one example, the GUI shows a system for scheduling one or more appointments between one or more healthcare providers and one or more clients.

An example application of the schedule generator system can be in the healthcare industry. In one example, a healthcare entity that provides at-home healthcare services, such as therapy in autism treatment programs, employs or contracts a network of healthcare providers in a particular geographical region. The healthcare entity will remotely set and match appointments between potential clients and the healthcare providers that the healthcare entity employs. In this example, the healthcare provider can be a person who is a doctor or therapist working in the healthcare industry. The client can be a patient or a group of patients for the healthcare provider.

In certain healthcare fields, healthcare providers will be hired or contracted by a healthcare entity to provide a certain amount of services per period of time. The amount of time agreed upon each healthcare provider and the healthcare entity for the healthcare provider is called authorized contract hours. The amount of time set for authorized contract hours can also be set by one or more $3^{rd}$ parties. Before creating a schedule, the healthcare entity will receive or already have information about each of their hired healthcare providers such as availability, number of hours committed each week to work, credentials, home location of each healthcare provider, and other factors. The healthcare entity will also receive or already have information about each of their clients such as availability, specific needs, preferred healthcare provider, and other factors.

In this example, the healthcare entity can have clients that are flexible with which provider is paired with the client, as long as each of the client's minimum requirements are met. There can also be clients that prefer to see specific healthcare providers in a specific routine schedule. There can also be different clients with different needs.

A user of the schedule generator can be an employee of the healthcare entity tasked to schedule appointments for clients. In this example, the schedule generator can determine appointment pairings based on relative geographic locations of each healthcare provider to clients, whether is the location from the healthcare provider's home, or from the location of a previous appointment. The schedule generator can also determine appointment pairings based on travel time for each healthcare provider, any preferred healthcare provider and frequency of appointments required by a particular client, applicable labor laws that could affect the pairings, whether a supervising healthcare provider needs or is requested to be present in the session, and others.

The schedule generator can determine schedule pairings with as many clients with the healthcare entity's healthcare providers while optimizing time including maximizing the use of authorized contract hours and minimizing dead periods, travel efficiency including minimizing cost of fuel and travel distance either for each healthcare provider in the healthcare entity's network or as a whole.

In one example, a schedule generator similar to that of the schedule generator above can be applied to other industries than healthcare. The schedule generator can be applied to any industry that typically has a network of providers (or resources) and a network of clients (or requirements) such that parings of resources and requirements for appointments are made. The resource-requirement pairings can be optimized especially in scenarios where the resources will be traveling from a base location, to appointments and other appointments within a geographic area. The schedule generator can also apply to industries and scenarios where the appointment times can be a short as minutes or seconds. For example, the schedule generator can be used to determine a delivery schedule for a fleet of delivery drivers, where the drivers are the resources and the delivery locations are the requirements. Thus, the scheduler can be used for any application that includes a pool of individual data that include a variety of factors and criteria that have to be met and optimally matched with another pool of individual data that includes its own variety of factors and criteria that have to be met.

I. Graphical User Interface

A. Data Focus

FIG. 1A illustrates an exemplary diagram of a first graphical user interface (GUI) that can be displayed on a display device for configuring and generating a schedule. In this example, appointments generated will be between one or more healthcare providers, such as therapists, and clients of an entity which employs and/or provides access to healthcare providers. As illustrated in FIG. 1A, a data scheduler GUI 100 is displayed to the user which includes client data and healthcare provider data. The client data and healthcare provider data can be pre-uploaded from a server to the schedule generator or manually inputted to the data scheduler GUI. The client data and healthcare provider data will be saved on to the schedule generator such that a user can see the updated data the next time the user or a different user logs onto the schedule generator system. The data scheduler GUI will then pre-upload the client and healthcare provider data including the previously added client and/or healthcare provider data into the GUI from the last session.

In this example, the data scheduler GUI 100 includes a healthcare provider field 110 and a client field 120. The configuration of the data scheduler GUI 100 can be configured such that the healthcare provider field 110 can be displayed above the client field. The data scheduler GUI 100 can include criteria relevant to generating a functional schedule. For example, the healthcare provider field 110 can include a healthcare provider selection field 112 including a drop-down selection menu to identify a particular healthcare provider. The client field 120 can include a client selection field including a drop-down selection menu to select and identify a particular client.

The healthcare provider field 110 can include a number of different selectable fields as to specify particular criteria or identify particular information of the healthcare provider selected. The selectable fields of the healthcare provider can include the home location of the provider, languages that the healthcare provider speaks, availabilities of the healthcare provider for a particular time period selected, and a credential field 114 which lists the credentials the healthcare provider has. These fields include information that the user can consider regarding information about the healthcare provider when scheduling an appointment with a potential client. The fields can also include information pertaining to the sex of the healthcare provider, and whether the healthcare provider has an assigned supervisor.

In one example, on a portion of the data scheduler GUI 100, a healthcare provider availability graph 116 is displayed in conjunction with the healthcare provider selection field 112. The healthcare provider availability graph 116 displays a graph of the particular healthcare provider selected from the drop-down menu of the healthcare provider selection field 112. In the example data scheduler GUI 100 of FIG. 1A, the user has selected the healthcare provider "Therapist1" and the "Weekly View". Thus, the healthcare provider availability graph 116 displays a schedule include time of day and day of week displaying which times of the week the particular healthcare provider is available and is not available. In this example, the graph can also show which part of the week the healthcare provider is working, as well as the client the healthcare provider is working with and the client's supervisor. The healthcare provider availability graph 116 can also display times where the healthcare provider is neither available to work or are currently assigned a session. In another example, the user can manually edit the displayed availabilities and sessions displayed.

Similarly, the client field 120 can include a number of different selectable fields as to specify particular criteria or identify particular information of the client selected. The selectable fields of the healthcare provider can include the home location of the client, required sex and/or credentials of the healthcare provider, the supervisor of the client, language requirements from the client, and other fields. These fields include information that the user can consider regarding information about the client when scheduling an appointment for the client.

The client field 120 can also include a number of different selectable fields as to specify particular criteria or identify particular information of the client selected. The selectable fields of the client field can include a client availability window 122 which allows the user to identify available times for the client based on the range of time the user selects for that particular client in the client availability window 122. The user can also manually edit the selected client's availability. The client field 120 can also include a blacklist field 124 which identifies all of the healthcare providers that the client or system has indicated is not compatible with the particular client for reasons beyond the limitations in language, gender, certification, etc.

On a portion of the data scheduler GUI 100, a client availability graph 126 is displayed in conjunction with the client field 120. The client availability graph 126 displays a graph of the particular client selected from a drop-down menu of a client select field. In the example data scheduler GUI 100 of FIG. 1A, the user has selected client "Client10" and the "Weekly View". Thus, the client availability graph 126 displays a schedule include time of day and day of week displaying which times of the week the particular client is available and is not available. In this example, the graph can also show which part of the week the client is already scheduled with appointments, thus unavailable to assign a session for those times. In another example, the user can manually edit the displayed availabilities and sessions displayed.

In one example, the healthcare provider availability graph 116 and client availability graph 126 is not limited to a specific duration of time but can also be configured to display time by day, month or year.

B. Query Focus: Scheduling a New Appointment for a Client

Figure 1B:
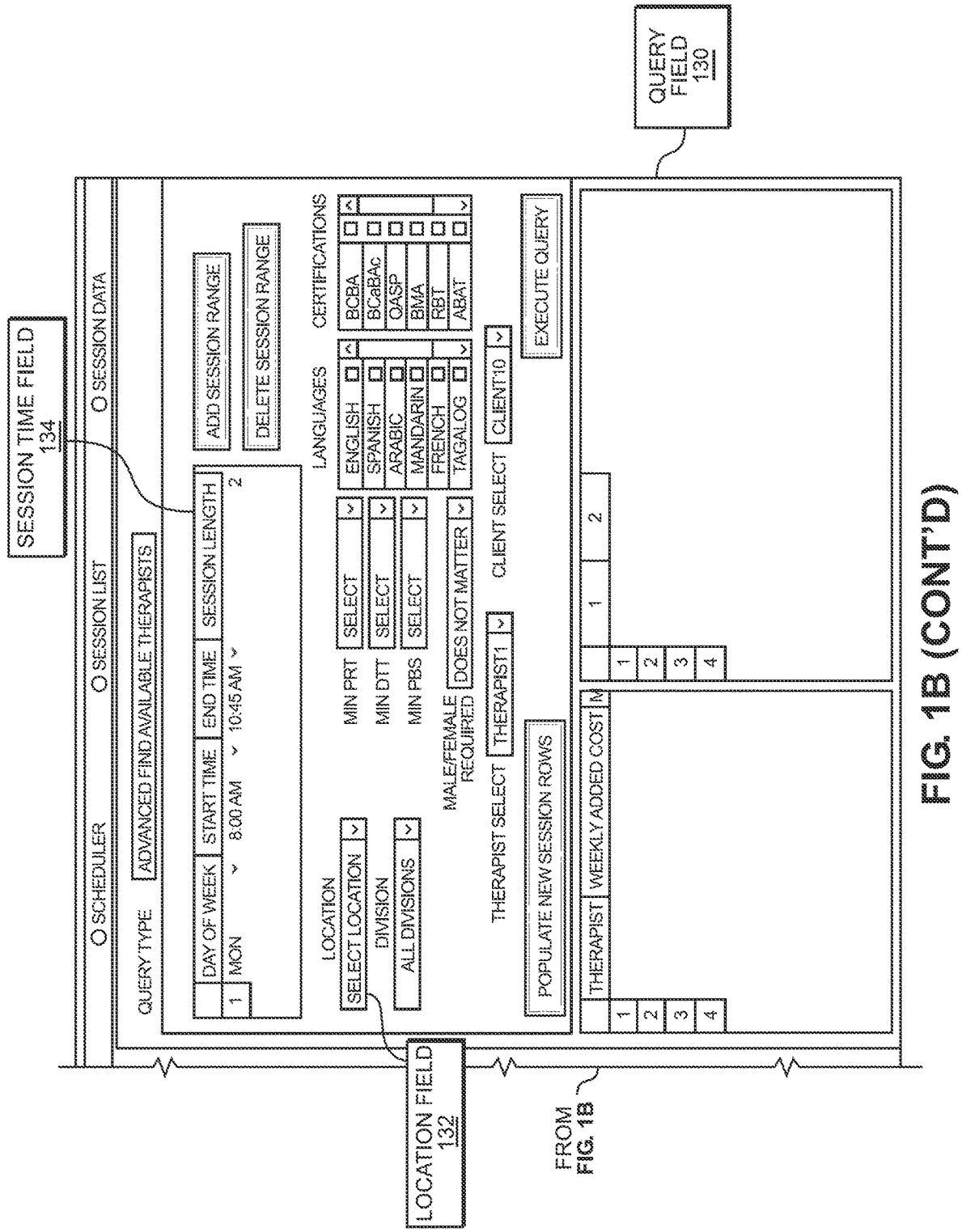

FIG. 1B illustrates the first data scheduler GUI 100 in another configuration. In this configuration, the system displays a screen that allows the user to execute different queries. In one example, the user can conduct a query related to scheduling a session between a healthcare provider and a client selected. In this configuration of the data scheduler GUI 100, a query field 130 is displayed. The query field includes fields and tables in which the user can select different query types and parameters in generating schedules for a client and/or healthcare provider.

In one example, the query field 130 can include a session time field 134 such that the user can select, add, and/or input new ranges of time a particular client selected is available. This is in contrast to display of data scheduler GUI 100 which displays sessions for a client and/or healthcare provider that is already present. The user can add multiple ranges by day of week, start and end time, and session length. The query field 130 can also include a location field 132 which allows the user to input and select a particular location of the client, which can be the client's place of residence. The query field 130 can also include different fields such as credentials required or preferred of the healthcare provider, languages preferred, or preference of the sex of the healthcare provider.

Figure 1C:
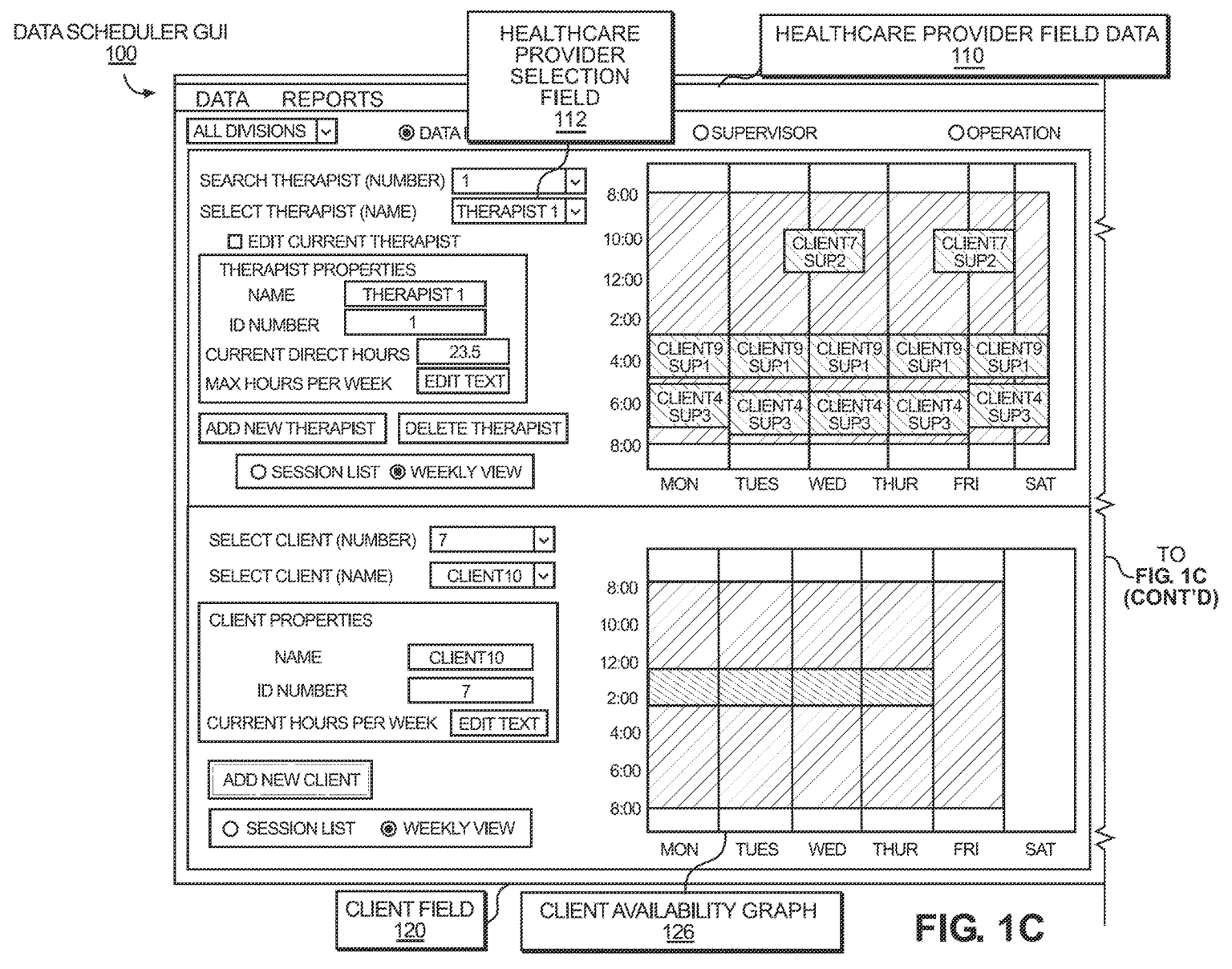
Figure 1C:
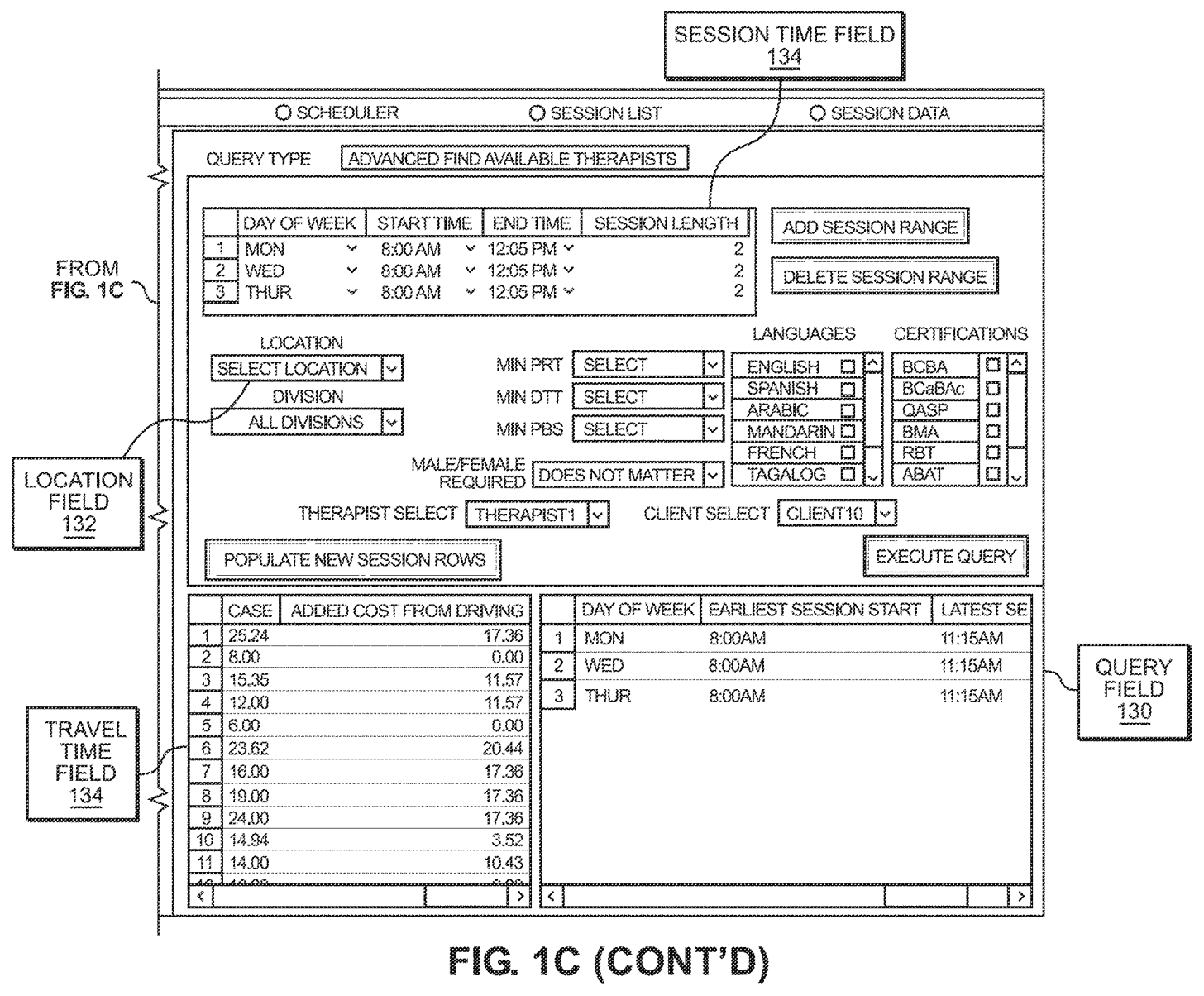

As illustrated in FIG. 1C, once the user has inputted and selected all the appropriate parameters of the particular client, the user can select an "execute query" button which allows the schedule generator system to generate a list of every healthcare provider that fit the criteria and parameters set in the query field. The list of healthcare providers can be displayed in the query field in a travel time field 136 which includes a table of the healthcare providers with availability to take on the client. The travel time field 136 will also include, on each line of each healthcare provider in the table, the total number of hours the healthcare provider can be scheduled for this client, and any additional cost from driving that the healthcare provider will accrue based on the location of the healthcare provider.

In one example, the drive time cost is a function of the reimbursable mileage of potential trip to the client and the actual drive time used for the session with the client. In one example, the travel time field 136 can be sorted to display the list of healthcare providers available based on alphabetical order of their names. In one example, the order of the healthcare providers available can be based on their drive time or cost.

Once a therapist is selected from the travel time field 136, another table can be displayed which includes particular time windows, sorted by day of week and time of day for the sessions, that the selected healthcare provider and client can work together. The data scheduler GUI 100 can also display the healthcare provider graph 116 so the user can see which other times the healthcare provider is available and not available.

Figure 1D:
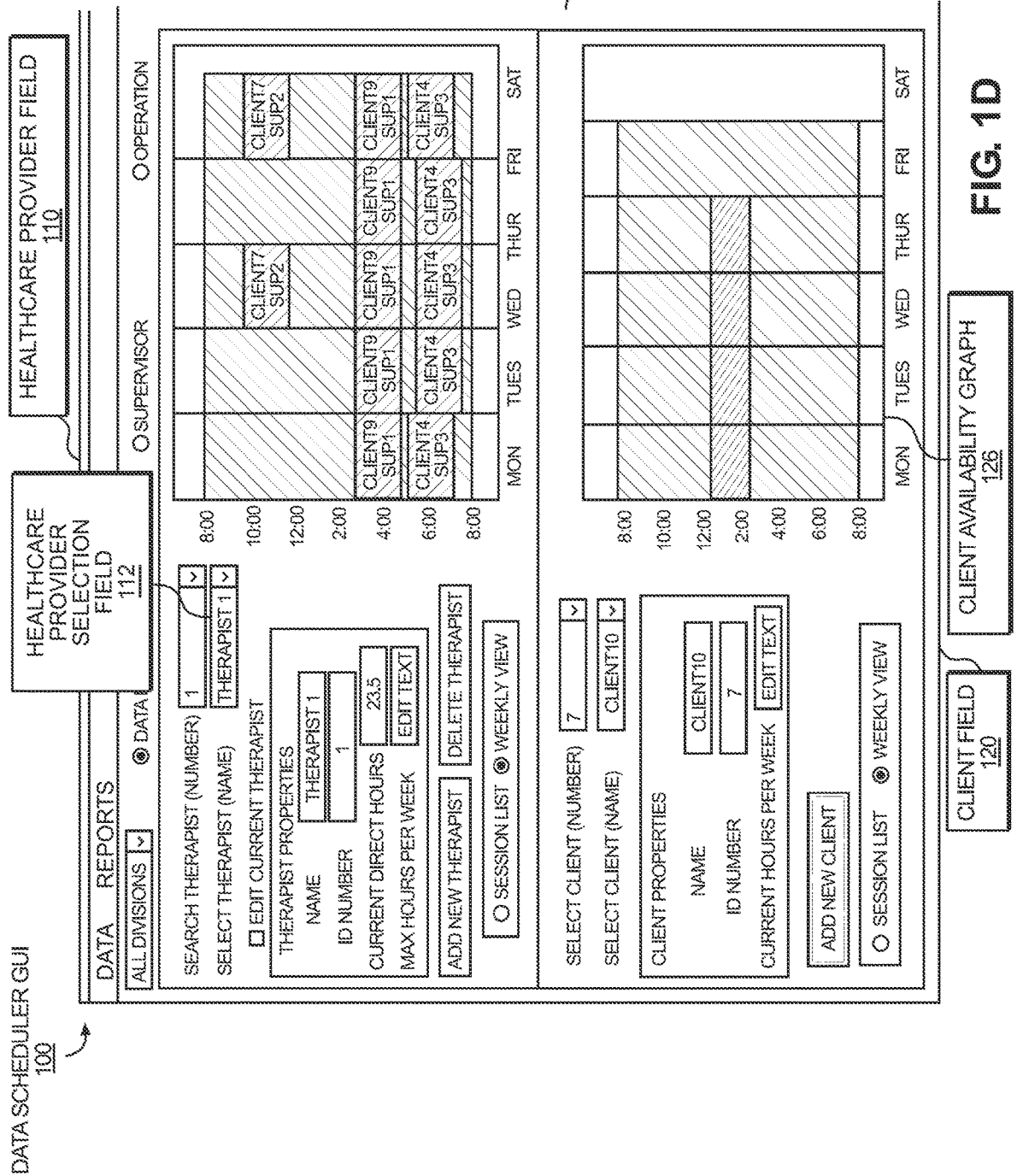

C. Query Focus: Scheduling a Replacement Appointment when a Healthcare Provider is Removed As illustrated in FIG. 1D, a query type that can be configured and displayed by the data scheduler GUI 100 related to a healthcare provider leaving the network of healthcare providers. In this example, the query type can be selected from a query type selector 140 of the query field 130. When this query is selected, the schedule generator GUI 100 can display the list of fields and information pertaining to a healthcare provider if the healthcare provider is removed from the network, such as when a healthcare provider quits.

For example, as illustrated in FIG. 1D, the user has currently selected to view information on healthcare provider "Therapist1". The healthcare provider availability graph 116 is displayed and shows that Therapist1 is currently scheduled to see 3 different clients throughout the current week selected. If, in that week, Therapist1 quits or the user would like information on the status of the clients if Therapist1 is no longer in the database, or available, the user can select the particular user, Therapist1, in the query field 130 with the query type selector 140 selected to a "Therapist Quitting" query type.

Figure 1E:
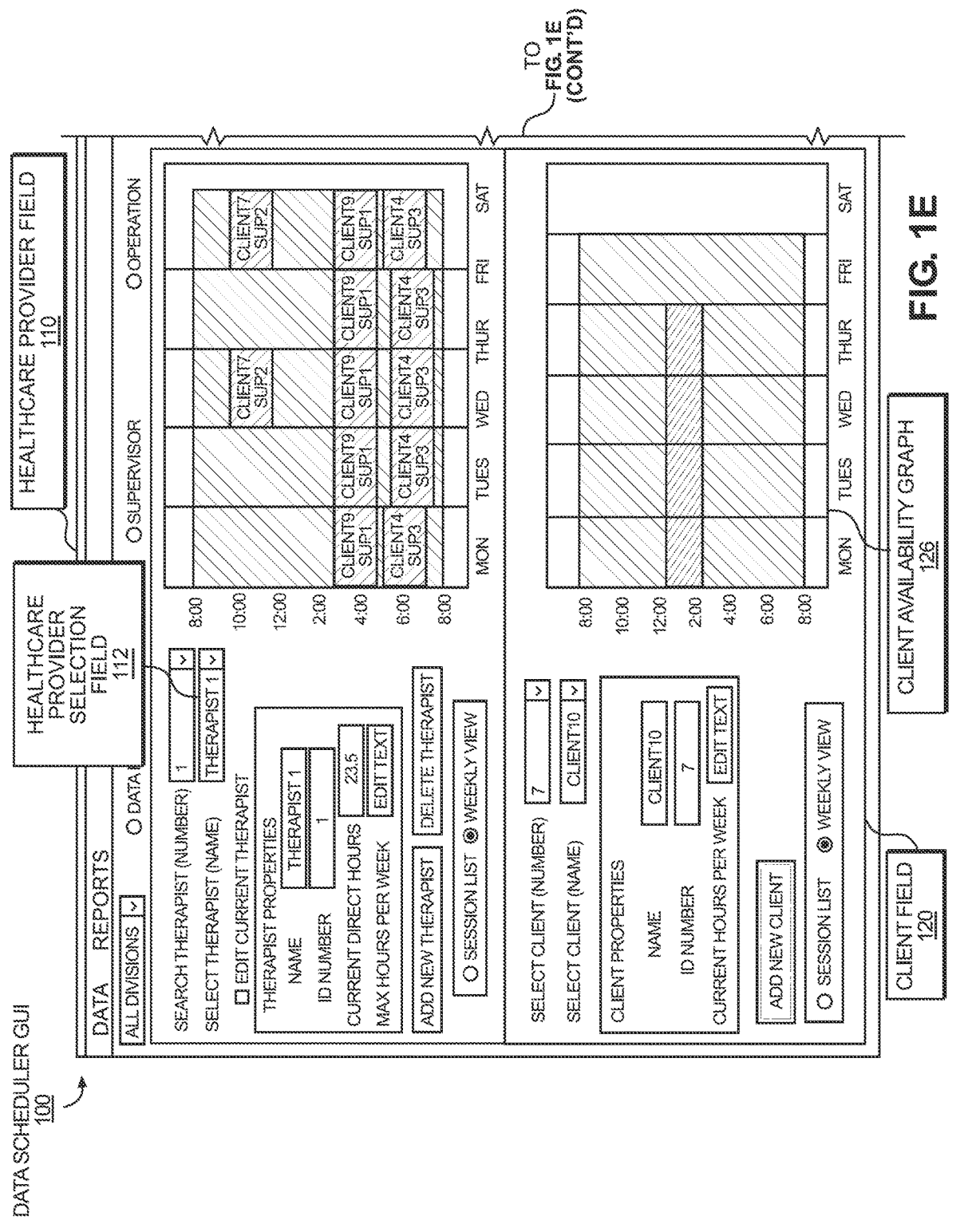

As illustrated in FIG. 1E, once the user selects "execute query" in the query field 130, a list of client names in client names 142 will be displayed in a table. The list of client names will be consistent with that of the client names that can be viewed on the healthcare provider availability graph 116 when the Provider Selection Field 112 matches the input parameters for the Therapist Quitting query.

In this example, the query field 130 can also display all of the healthcare providers, in a list, that can take over and replace the session currently scheduled between the client and the presently removed healthcare provider. Once a client is selected, the display on the query field 130 will update with a list of healthcare providers and populate with information on each line of each healthcare provider in the table, the total number of hours the healthcare provider can be scheduled for this client, any additional cost from driving that the healthcare provider will accrue based on the location of the healthcare provider.

The user can then view this information from the tables of the query field 130 and select an appropriate replacement healthcare provider with each of the clients affected by the presently removed healthcare provider leaving the system without manually inputting criteria and or rules of each client as if it was a new client's information inputted to find a healthcare provider such as the examples provided in FIGS. 1B and 1C. This function would also help the user schedule and reschedule appointments for the client without needing to change the appointment times.

D. Optimization

Figure 2A:
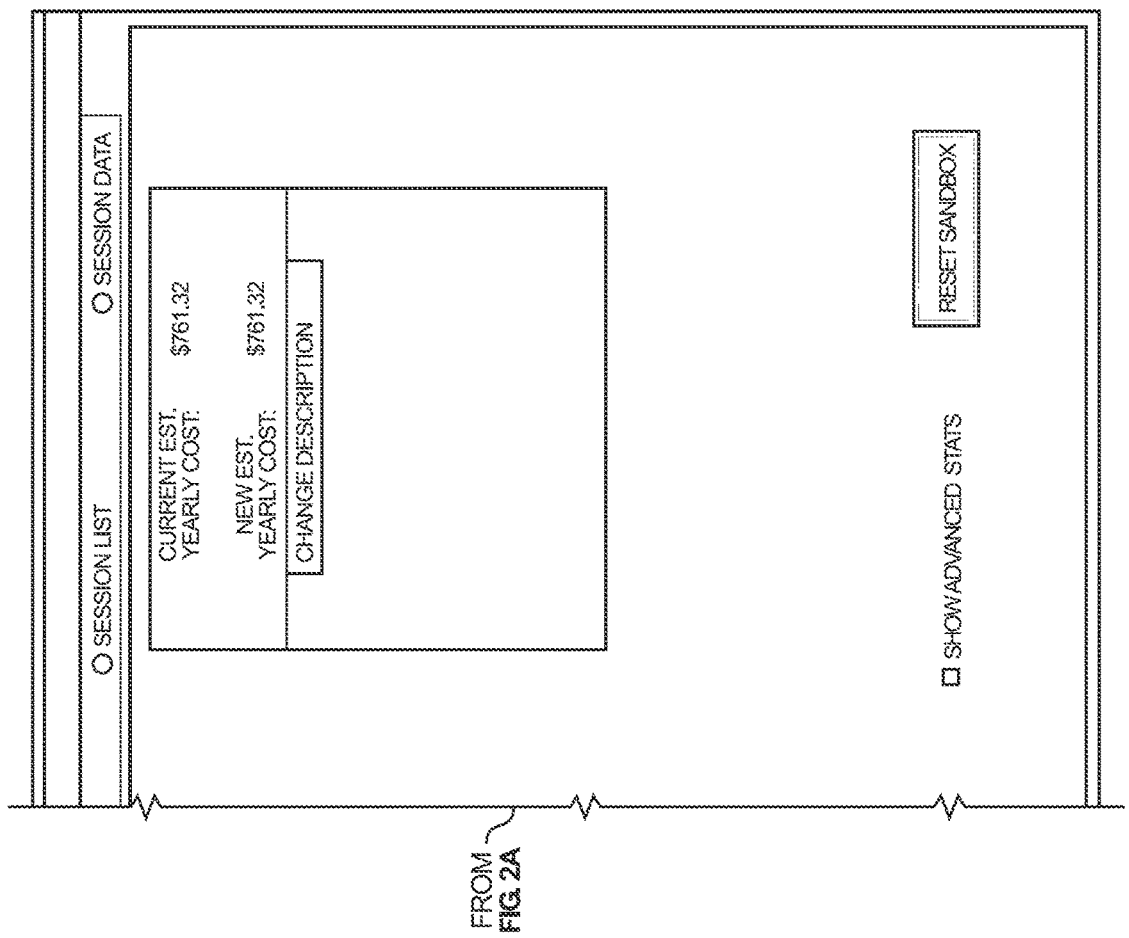
FIGS. 2A-2B show diagrams illustrating a graphical user interface that can be displayed on a display device for optimizing a schedule according to some embodiments of the invention.
Figure 2B:
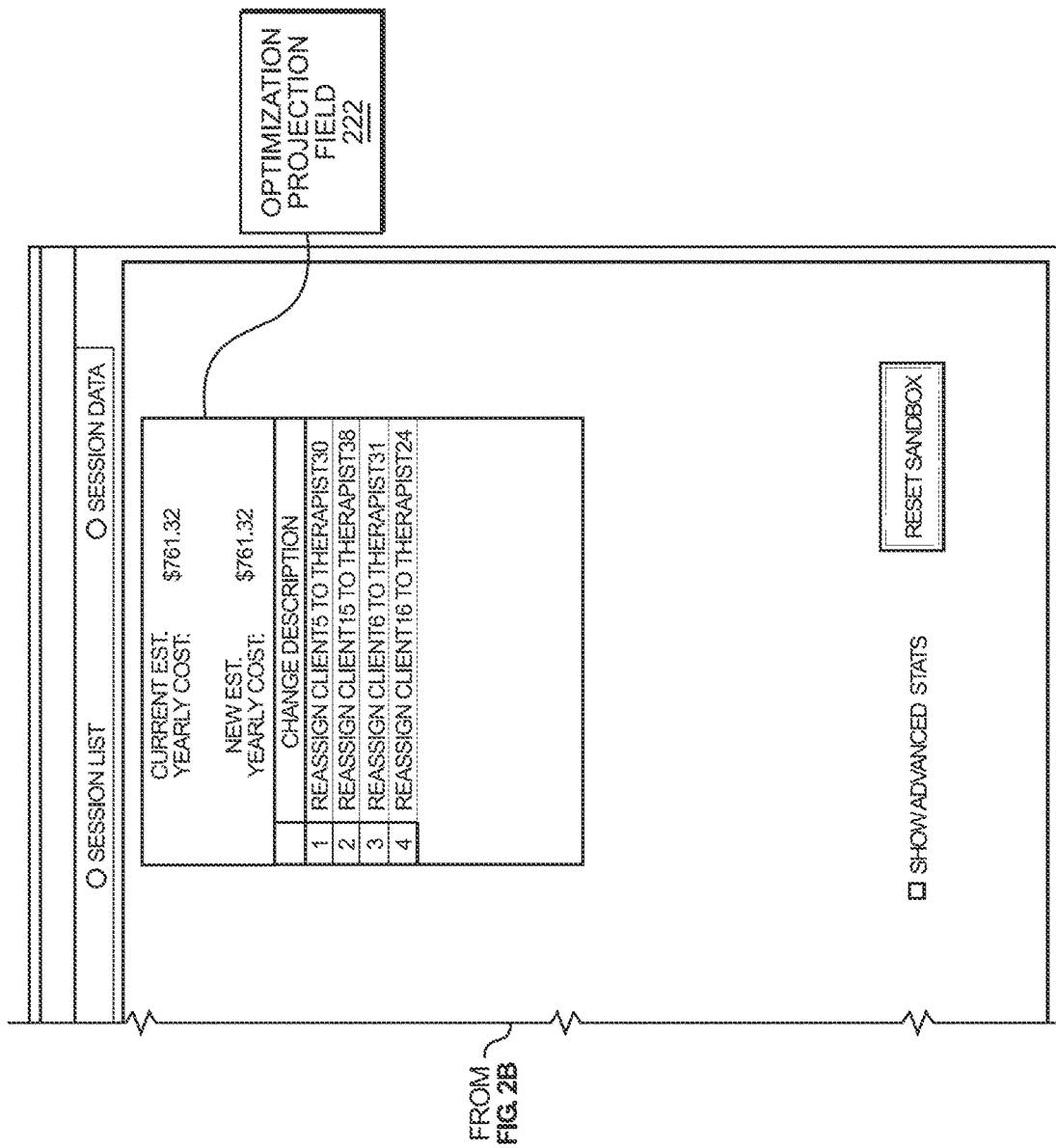

FIGS. 2A-2B illustrates another example GUI of the schedule generator. In this example, the GUI is an optimization GUI 200 for optimizing appointment times among clients and healthcare providers based on the existing schedule.

Optimization GUI 200 includes a rule selector 210 having a target metric field 212. In addition to the target metric field 212, the rule selector 210 can also include a similarity type field and a similarity threshold field where the user can select different fields that can influence the behavior of the algorithm. The optimization GUI 200 also includes an optimization table 220 and can display a client availability graph 226 and healthcare provider availability graph 236.

In this example, the rule selector 210 can include a plurality of selectable algorithms from a drop-down menu which used to optimize the scheduling. In one example, the algorithm selected from the rule selector can be healthcare provider focus, cost focus, etc. For example, in the algorithm can be used to display different configurations of healthcare provider and client matches for sessions such that the total number of hours for a healthcare provider or a plurality of healthcare providers for a period of time such as a day or week, is maximized. In this example, the algorithm would consider the total travel time of each of the healthcare providers and how the travel time can be minimized to such that the healthcare provider can fit an optimized number of sessions.

In one example, the different algorithms, whether it is one relating to maximizing the number of sessions each therapist could have or minimizing travel time among the network of healthcare providers, or a combination thereof, the algorithms used to optimize the different parameters can be configured to optimize the parameters based on certain unchangeable parameters, such as the client appointment time. For example, whether the specific pairings of healthcare providers and clients of any particular range of time changes, the client's scheduling time can remain unchanged. If the user indicates that a particular client or clients would like the schedule to remain unchanged from week to week, or any other frequency, the schedule generator will match pairs and display potential pairings around that rule.

In one example, as illustrated in FIG. 2A, the user can select a "Bang for the Buck—Therapist Focus" algorithm from the selectable rule selector 210. In this example, the schedule generator will aggregate all of the scheduling information and requirements from each healthcare provider and client and swap clients and healthcare providers, if needed, to generate a new schedule based upon cost savings while maintaining the number of hours the Healthcare Providers (therapists) worked in a given week. The cost savings accounted for by the algorithm can be impacted by a target metric, selected by a target metric field 212. In this example, the target metric selected is the "Driving Cost—Type 1", which internally represents a common cost reimbursement formula. Once the user selects and clicks on the "Generate Results" button to run the algorithm, the optimization GUI 200 will display information of healthcare provider and client matches in the optimization table 220.

In this example, as the user selects any information from the table, such as "weekly savings", client availability graph 226 and healthcare provider availability graph 236 will update and correspond to the parameter selected based on the selection in the optimization table 220 regarding the particular client and healthcare provider. The update will provide information based on the potential change in healthcare provider to client instead of the presently scheduled client-healthcare provider pair.

As illustrated in FIG. 2B, if and when the user implements the suggested changes from the algorithm, the GUI 200 will then display and/or update an optimization projection field 222 which lists the particular reassignments of client-schedule pairs, the cost savings for implementing these changes. In one example, the displayed cost savings is based on the cost saving if the change is permanent for the rest of the year.

E. New Schedule

1. Generate Schedule

Figure 3A:
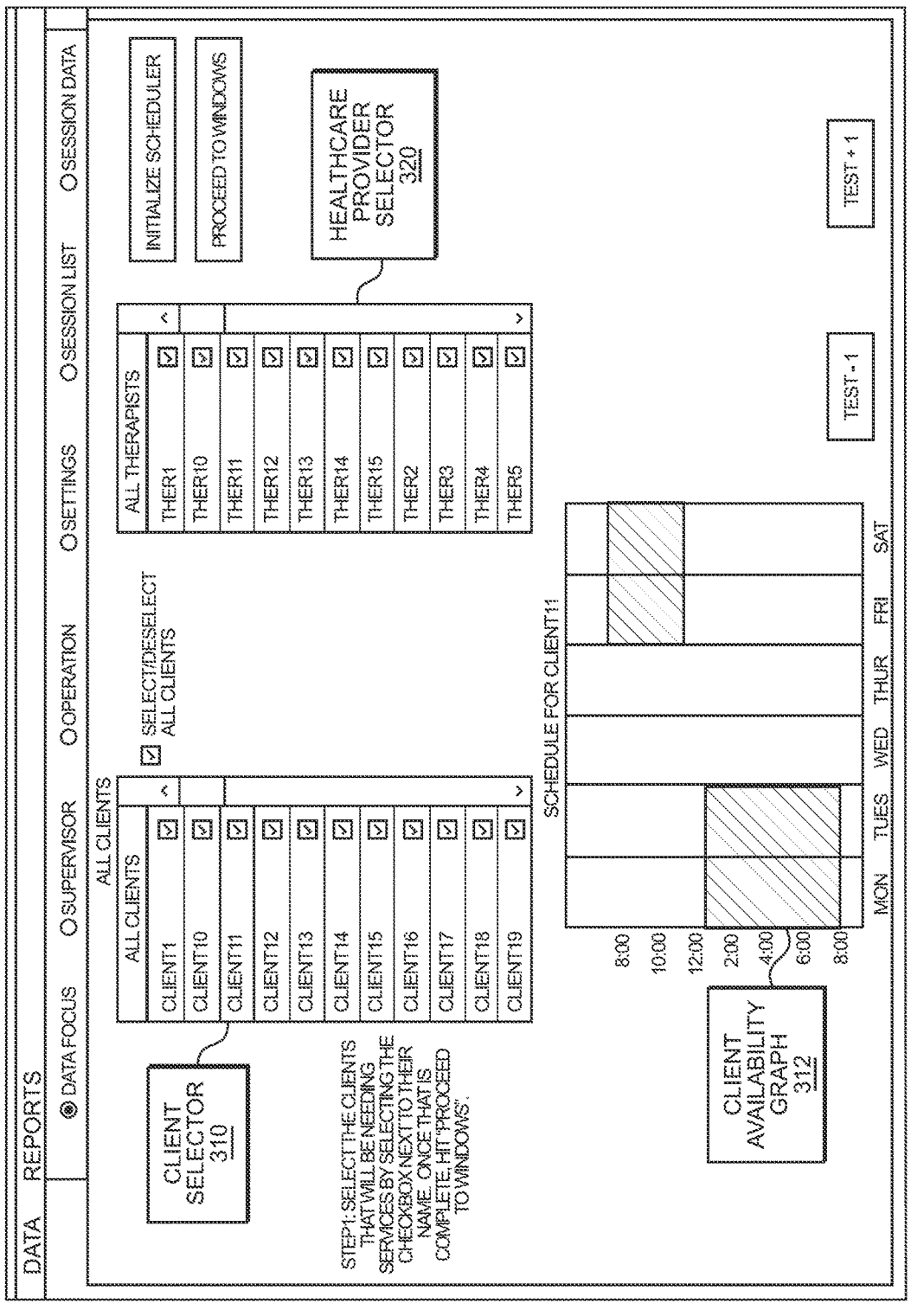
FIGS. 3A-3B show diagrams illustrating a graphical user interface that can be displayed on a display device for generating a schedule according to some embodiments of the invention.
Figure 3B:
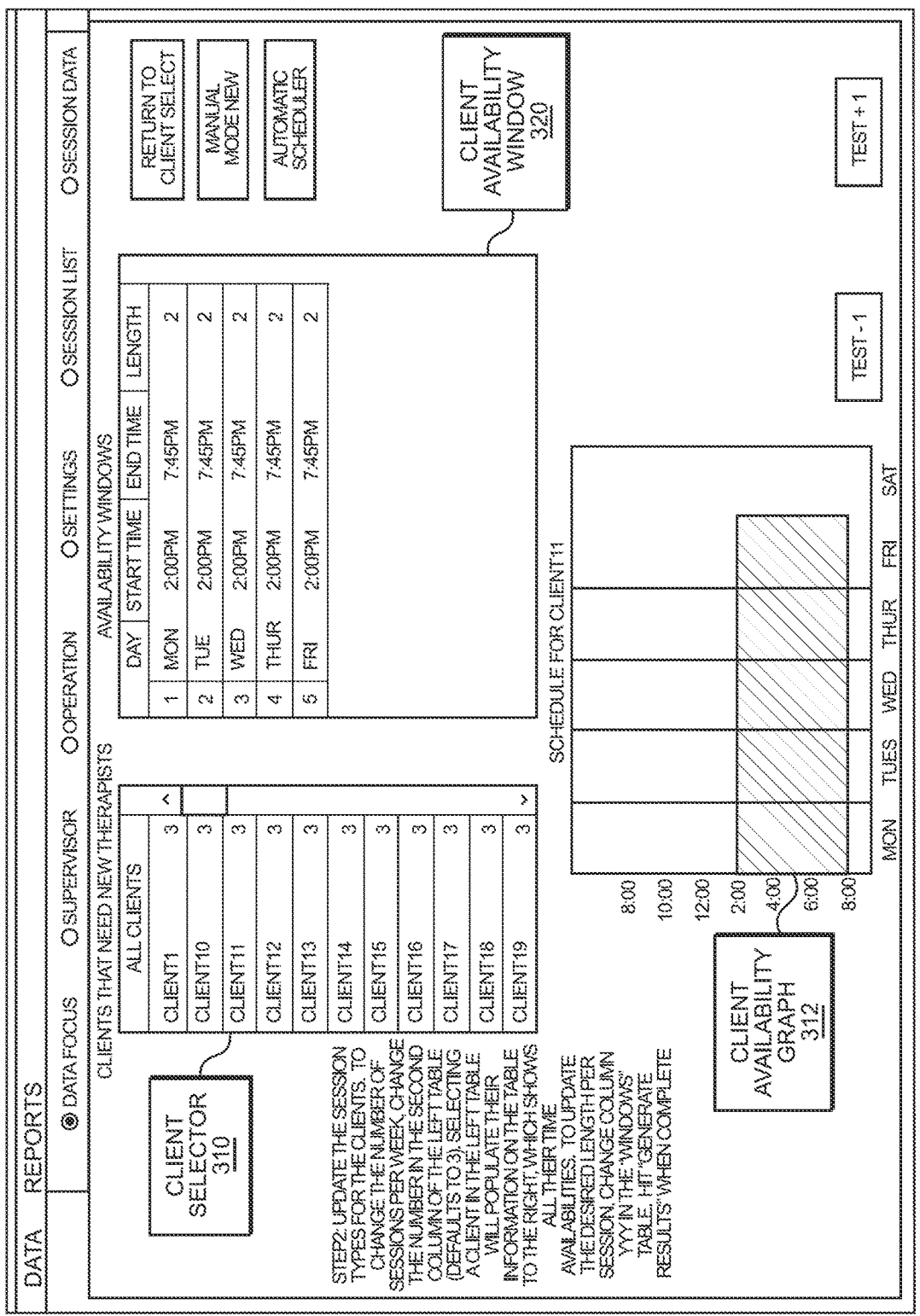

FIG. 3A-3B illustrate a scheduler selection GUI 300 configured to set up a schedule among clients and healthcare providers. In this scheduler selection GUI 300, the user can generate a new schedule from the list of clients and healthcare providers between a client and a healthcare provider or among a number of clients and a number of healthcare providers all at once. The scheduler selection GUI 300 includes a client selector 310 and a healthcare provider selector 320.

In this example, the user can generate a new schedule based on the number of clients selected and healthcare providers selected. If the user checks the box "Select All Clients" and "Select All Therapists" or a different number of healthcare providers selected, the schedule generator will generate a schedule to be displayed including all clients. The user can then click the "Initialize Scheduler" function or "Proceed to Windows" function.

Next, as illustrated in FIG. 3B, the client selector 310 will update and display a list of clients that will need new healthcare providers. In this configuration, the user can select a particular client and a client availability window 320 will populate the window with table displaying the number of sessions per week, time for each session, and current availabilities. The client availability graph 312 will also update based on the client selected. The client selector 310 can be populated with a list of client names that were previously selected for inclusion.

In one example, the client selector 310 will also include a field indicating the number of sessions required per week of the particular client. The number can be manually inputted or edited by the user. The schedule generator can also have a default number set, such as three times per week. The session lengths displayed on the graph can also be changed to reflect different time intervals by changing the session length field in the client availability window 320.

2. Graphically Assign Schedule

FIGS. 4A-4I illustrate a GUI of a configurable schedule based on the schedule created by the scheduler selection GUI 300 of FIGS. 3A-3B. The GUI of FIGS. 4A-4I include a graphical scheduler selection GUI 400 which includes a healthcare provider field which presents all of the healthcare providers' availability in graph form, similar of that to healthcare provider availability graph 116 of FIGS. 1A-1E, and a selectable client selector 420 which includes a list of clients that require new sessions.

Figure 4A:
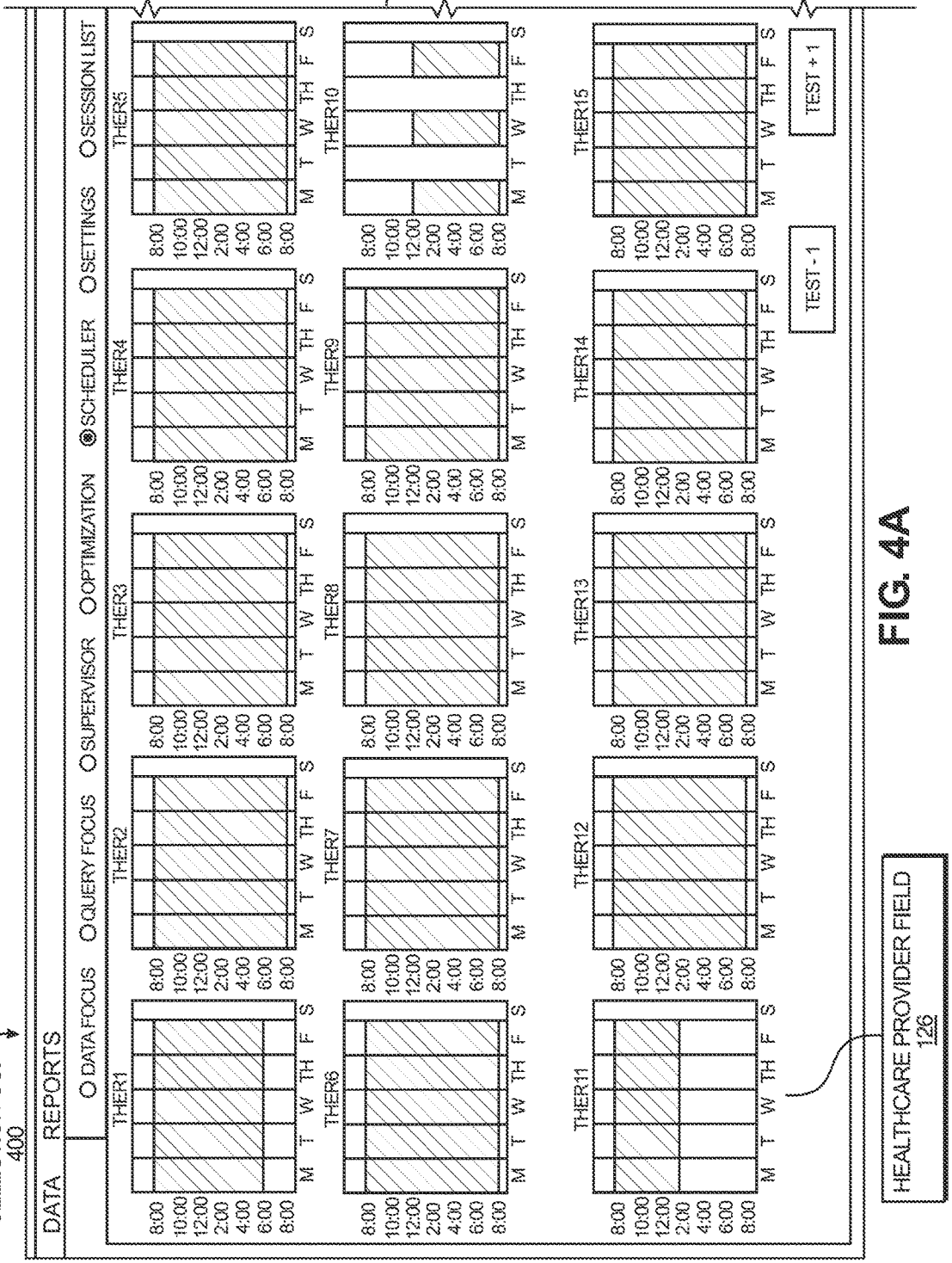
Figure 4A:
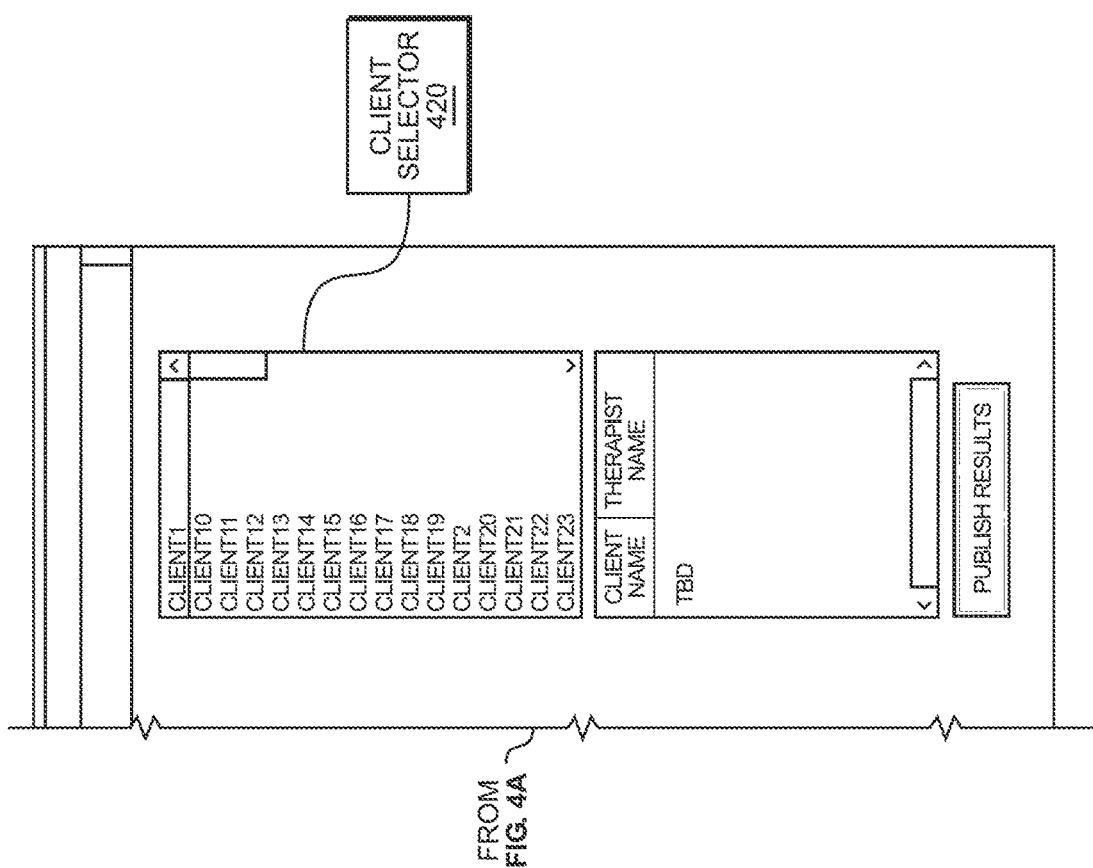

As illustrated in FIG. 4A, a default, initial, healthcare provider field 410 is displayed. The graphs of each healthcare provider will graphically display all of the availabilities of the healthcare providers.

Figure 4B:
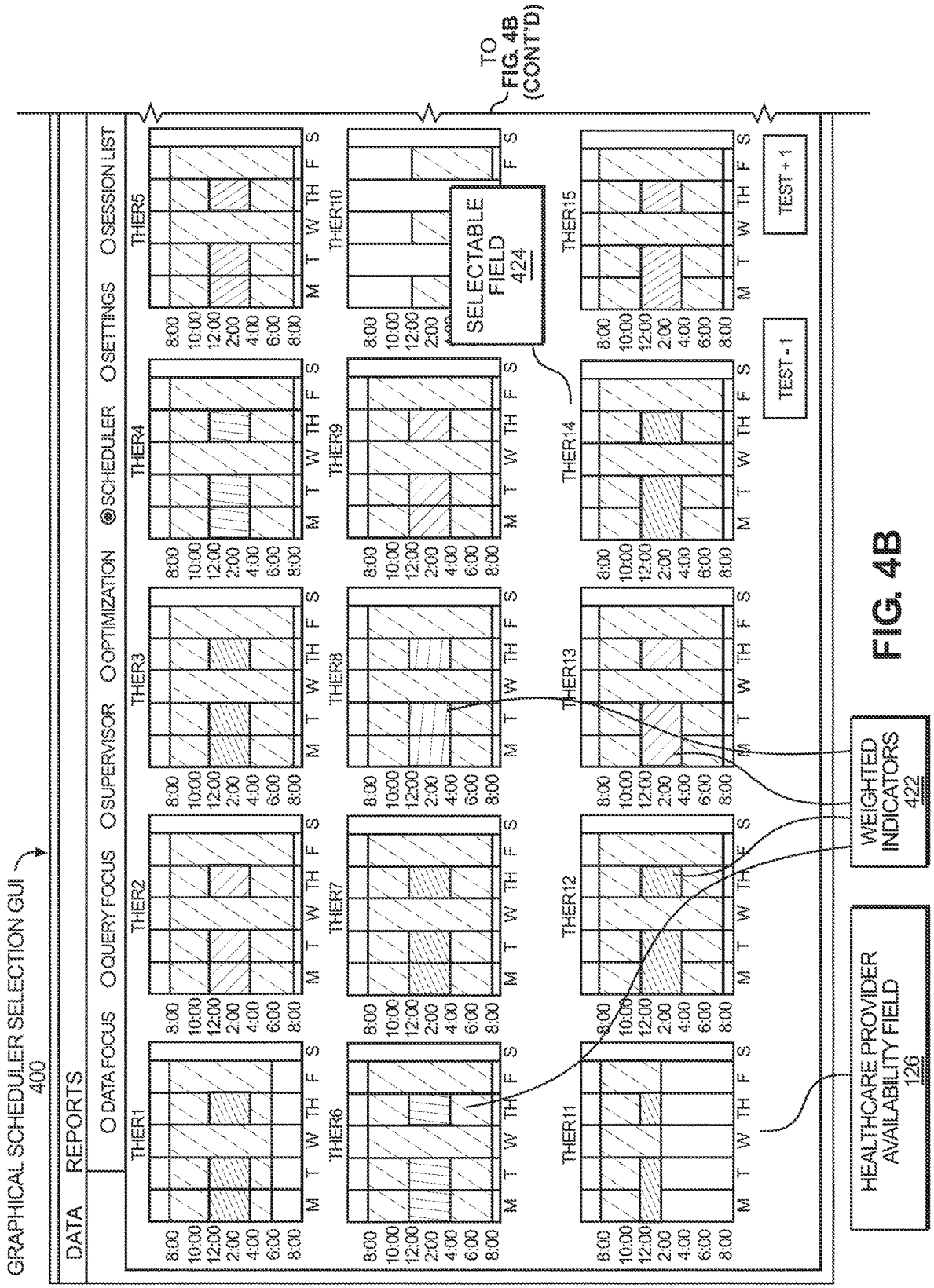

As illustrated in FIG. 4B, as the user selects a particular client from the client selector 420, the graphs of each healthcare provider in the healthcare provider field will update with graphical representations indicating availability of the selected client with each of the healthcare providers. In one example, the graphical representations of availability of the updated graphs of each of the healthcare providers can be ranked to indicate which healthcare provider is the best fit for the selected client. In one example, the ranking can be weighted indicators 422 based on color codes. In this example, the ranking can be based on any additional driving cost and dead time, the period the healthcare provider is neither working nor traveling from the start of his first session to the end of his last session. For example, a dark green color can indicate the best rank and a red color can indicate the worst fit. The user can then select the healthcare provider based on the information provided by the graphical representations of availability and the rankings in each availability.

For example, in FIG. 4B, the user can determine that based on the availability and ranking, healthcare provider, "Ther14", is the best fit for the selected client. The user can select and click on the Ther14 graph and the healthcare provider field 410 will update and only display a selectable field 424 including an enlarged and selectable version of the Ther14 graph, as illustrated in FIG. 4C.

Figure 4C:
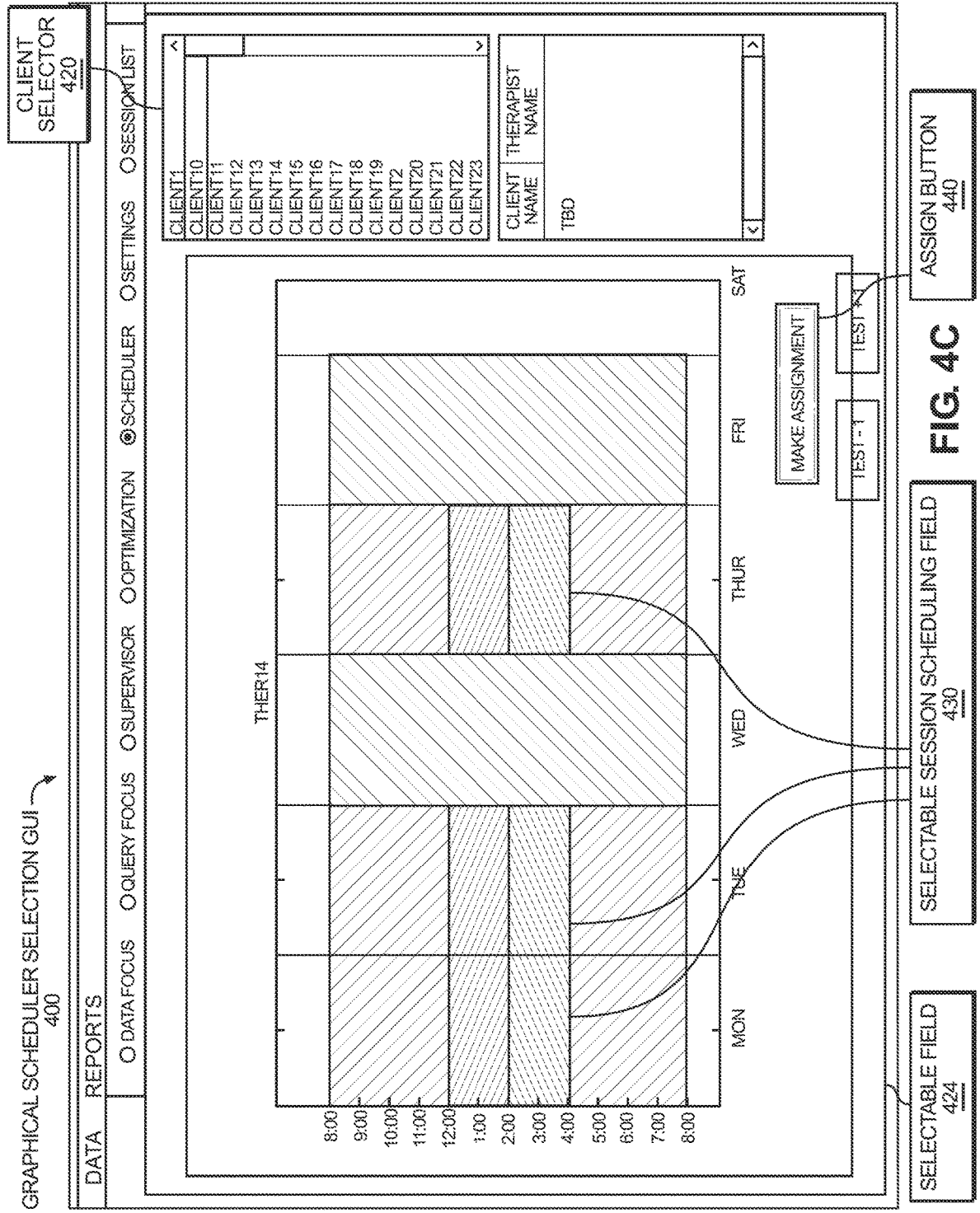

As illustrated in FIG. 4C, the user can then highlight and/or select any or all of the available time windows in a selectable session scheduling field 430 between the selected healthcare provider and client. In this example, the user can highlight all three available time windows, creating sessions including one on Monday, one on Tuesday, and one on Thursday between Ther14 and Client 10. When the user is satisfied with the selection, the user can click the assign button 440 and the schedule generator will assign the session or sessions between the client and healthcare provider based on the selected times.

Figure 4D:
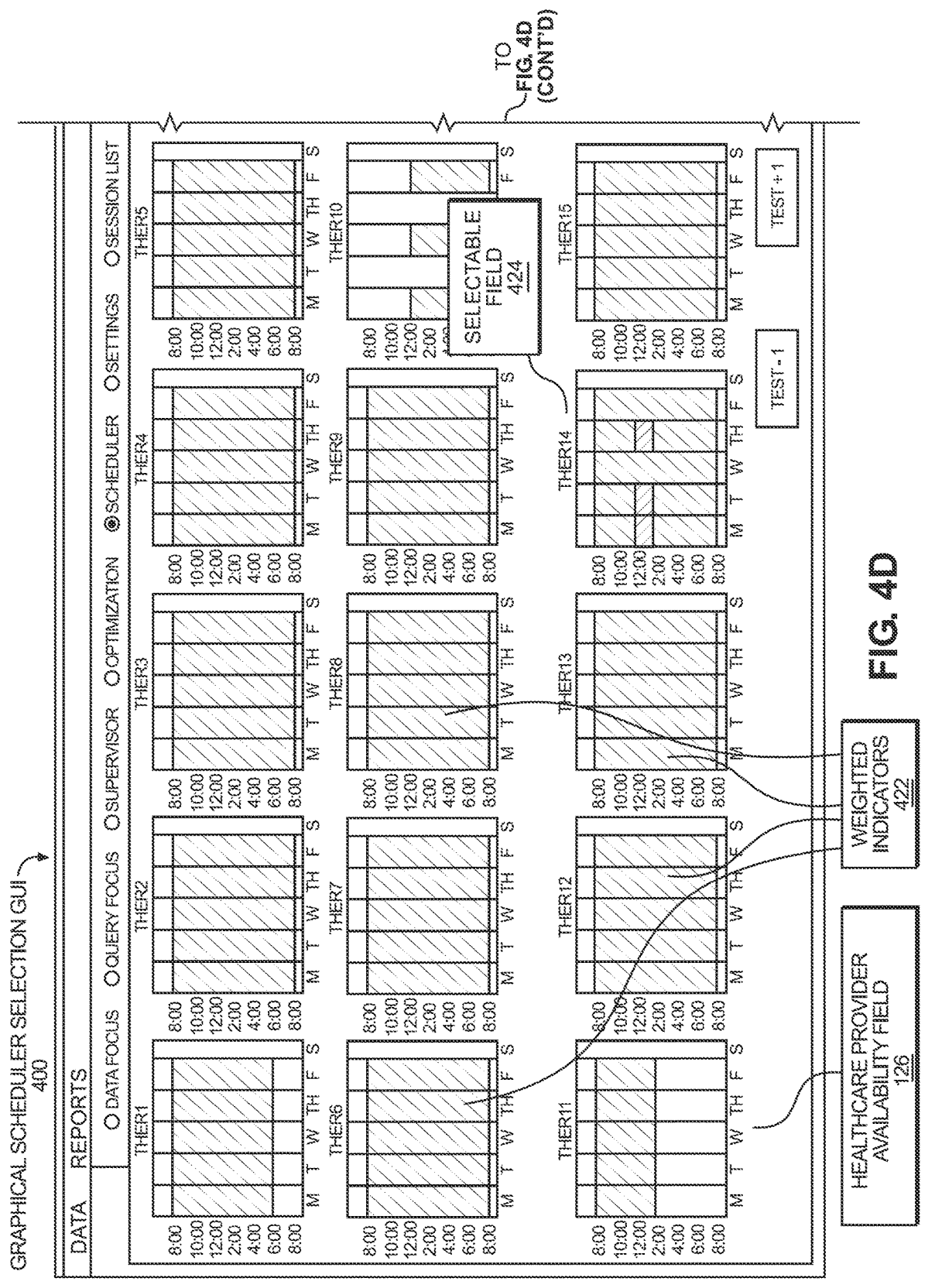

As illustrated in FIG. 4D, once the user has finished the particular assignment between the selected client and selected healthcare provider illustrated in FIG. 4C, the graphical scheduler selection GUI 400 will revert back to displaying the healthcare provider availability field 410 including all of the graphs of the users. At this step, because the user has now assigned a session or sessions for a particular client-therapist pair, that particular therapist's graph will now update and graphically show that booking a session during those times are unavailable. This is because those time slots for sessions are already booked with the previously selected client. As illustrated in FIG. 4D, the assignment will be listed in the assignment list 450. In this example, the list will include one client-healthcare provider, which is Client 10 and Ther14.

Figure 4E:
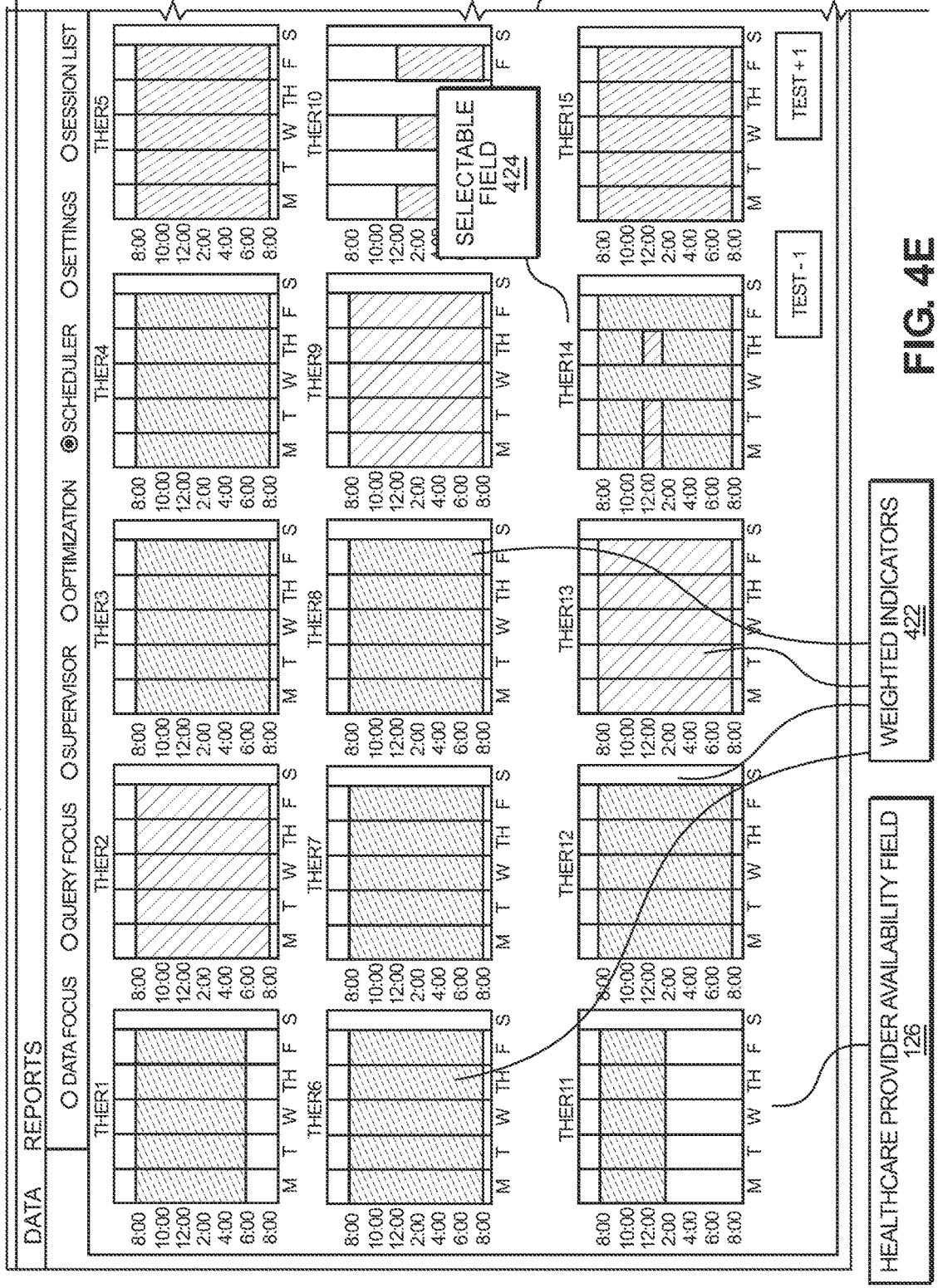
Figure 4E:
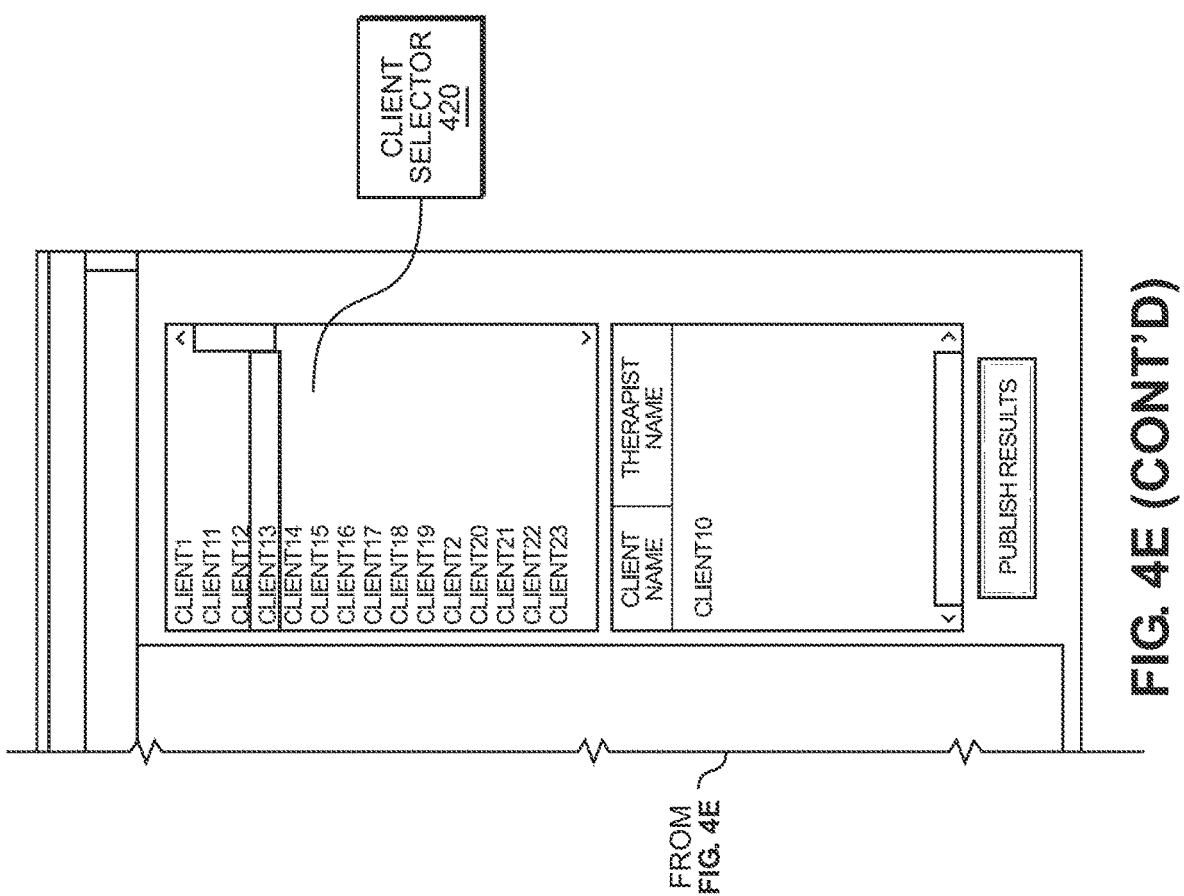

FIG. 4E illustrates the same graphical scheduler selection GUI 400. As illustrated FIG. 4E, when the user wants to select and assign a session or sessions for a different client, the graphs of the healthcare provider availability field 410 will update with the graphical representations of availability and rankings in each selectable field 424 similar to that of the selectable fields 424 in FIG. 4C. However, unlike that of FIG. 4B, the selectable fields in FIG. 4E will include the graphical representations of the unavailable time windows due to the previously booked sessions with previously assigned clients.

Figure 4F:
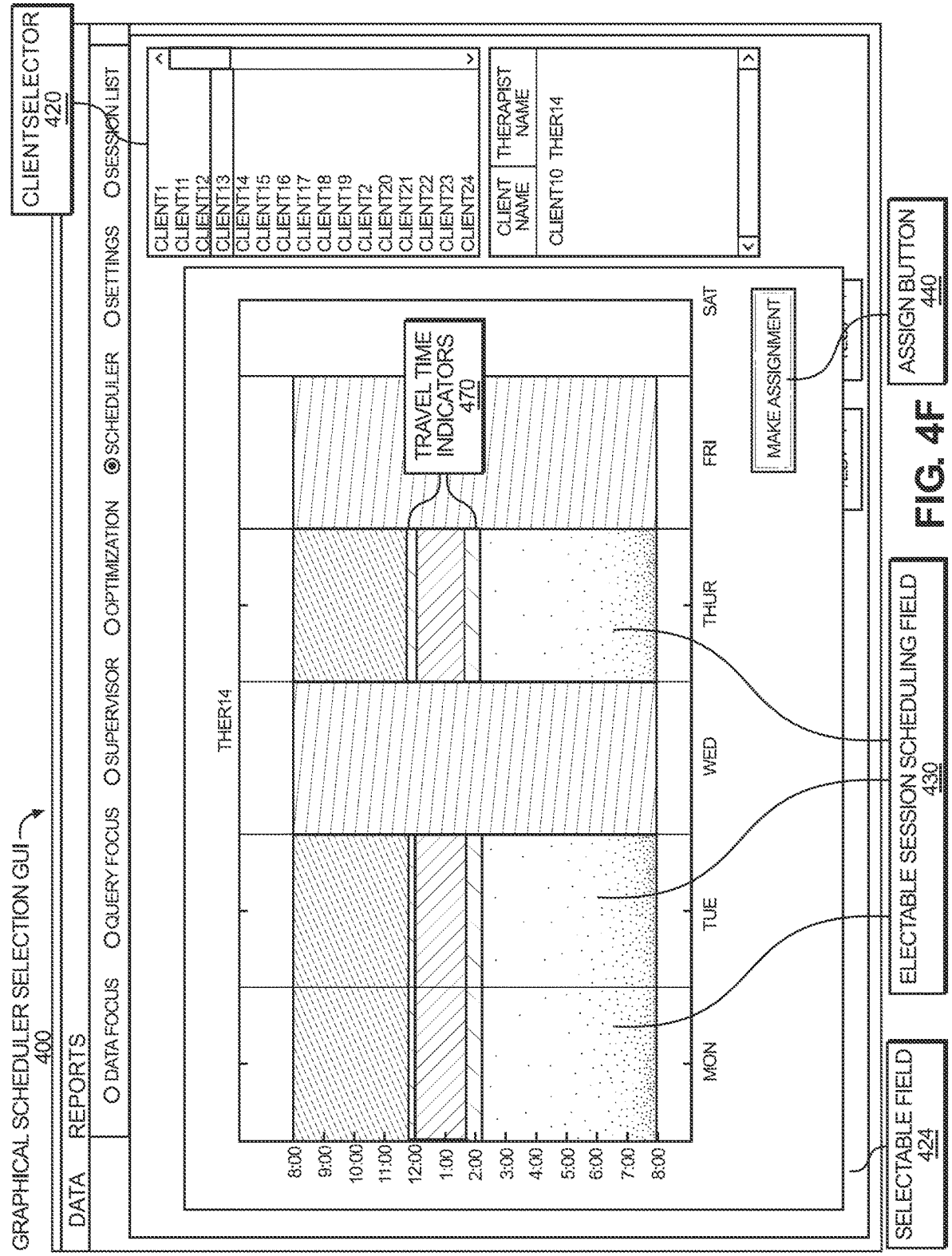

Further, as illustrated in FIG. 4F, if the user selects a selectable field 424 of a healthcare provider that already has sessions booked, the updated selectable field 424 in the expanded view will update the and graphically indicate the best times, based on driving time for the healthcare provider, to book session for this particular healthcare provider. The selectable field 424 will graphically represent the best times to book a session with a color gradient. The color gradient can range from a dark green color being representing the best time through the color spectrum to an orange color representing the worst time. This is graphically represented in the example selectable field 424. In this GUI, the color gradient can also depend on the dead time, which is the period the healthcare provider is neither working nor travelling from the start of his first session to the end of his last session. In one example, the dead time will be automatically generated by the schedule generator based on drive time between one client location to the next or from one client location back to the home location for the healthcare provider. In this GUI, the color gradient can also depend on influences external to the selected client-therapist pair, such as whether or not making the selected pairing would prevent the Entity from providing services to other clients.

In this GUI, the selectable field 424 will also display, graphically, travel time indicators 470 representing the travel time period that needs to be allocated for the healthcare provider. In this example, the latest session could end for Client13 in the morning time would be 11:45 because Ther14 has a 15 minute drive to Client10's location. Similarly, the earliest a session can begin in the afternoon portion is 2:15 since Ther14 would have a 30 minute drive time from Client10 to Client13. The GUI can graphically display such feature with travel times and distances being variable between start and end locations, as well as departure time.

Figure 4G:
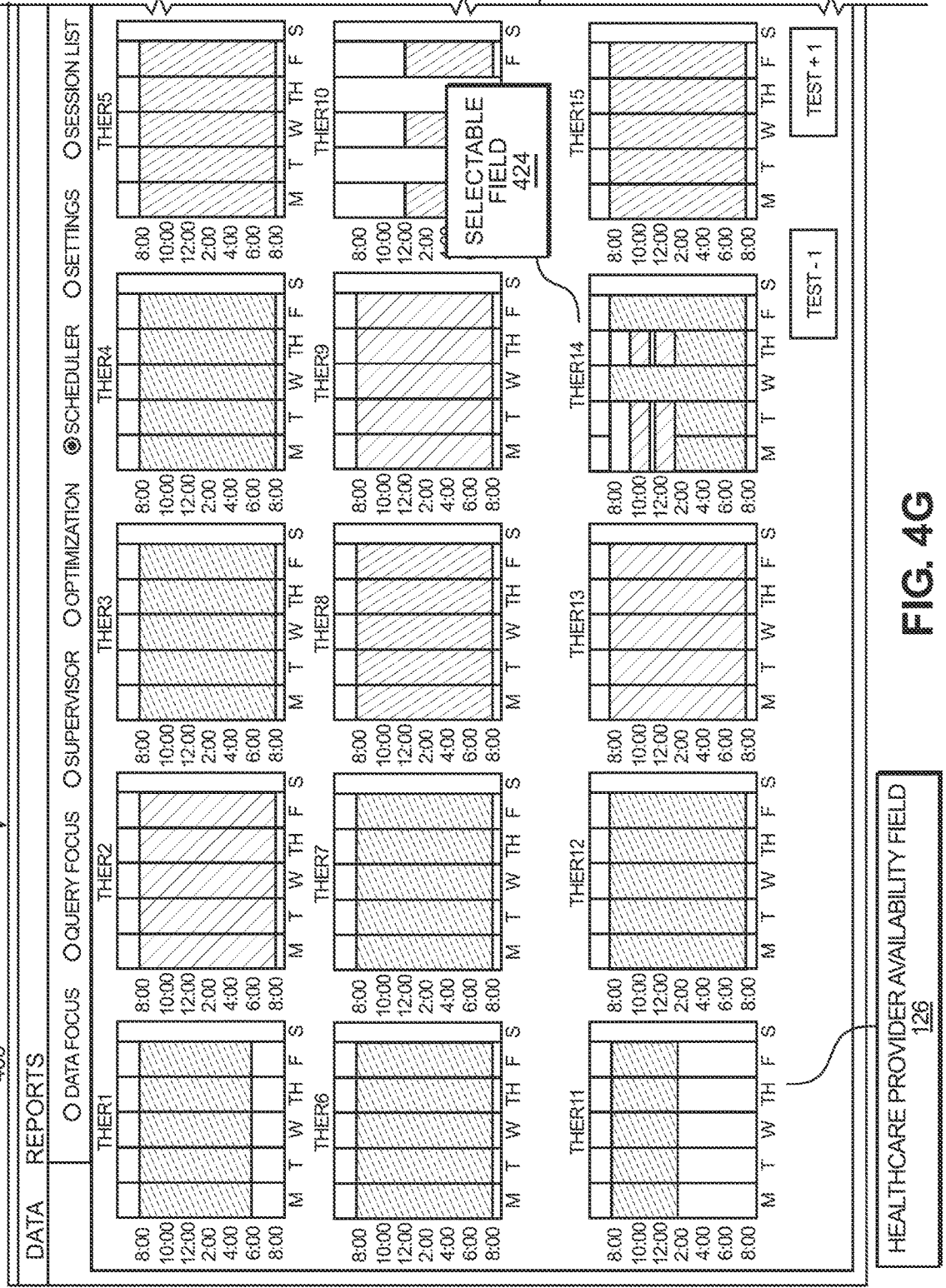
Figure 4G:
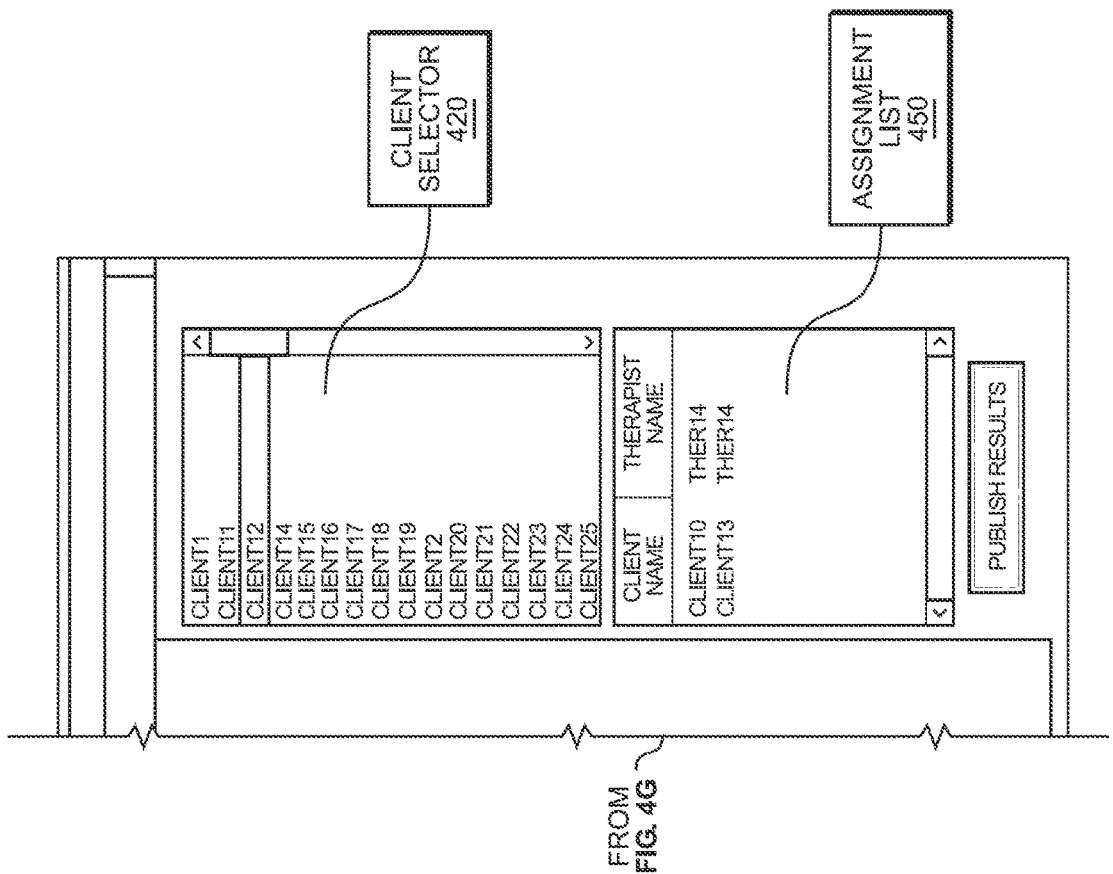

As illustrated in FIG. 4G, once the user then assigns the presently selected client, in this case the second selected client, the graphical scheduler selection GUI 400 will update the display once again including the healthcare provider availability field 410 with updated selectable fields accounting for all currently booked sessions represented graphically. Further, the assignment list 450 will also update.

Figure 4H:
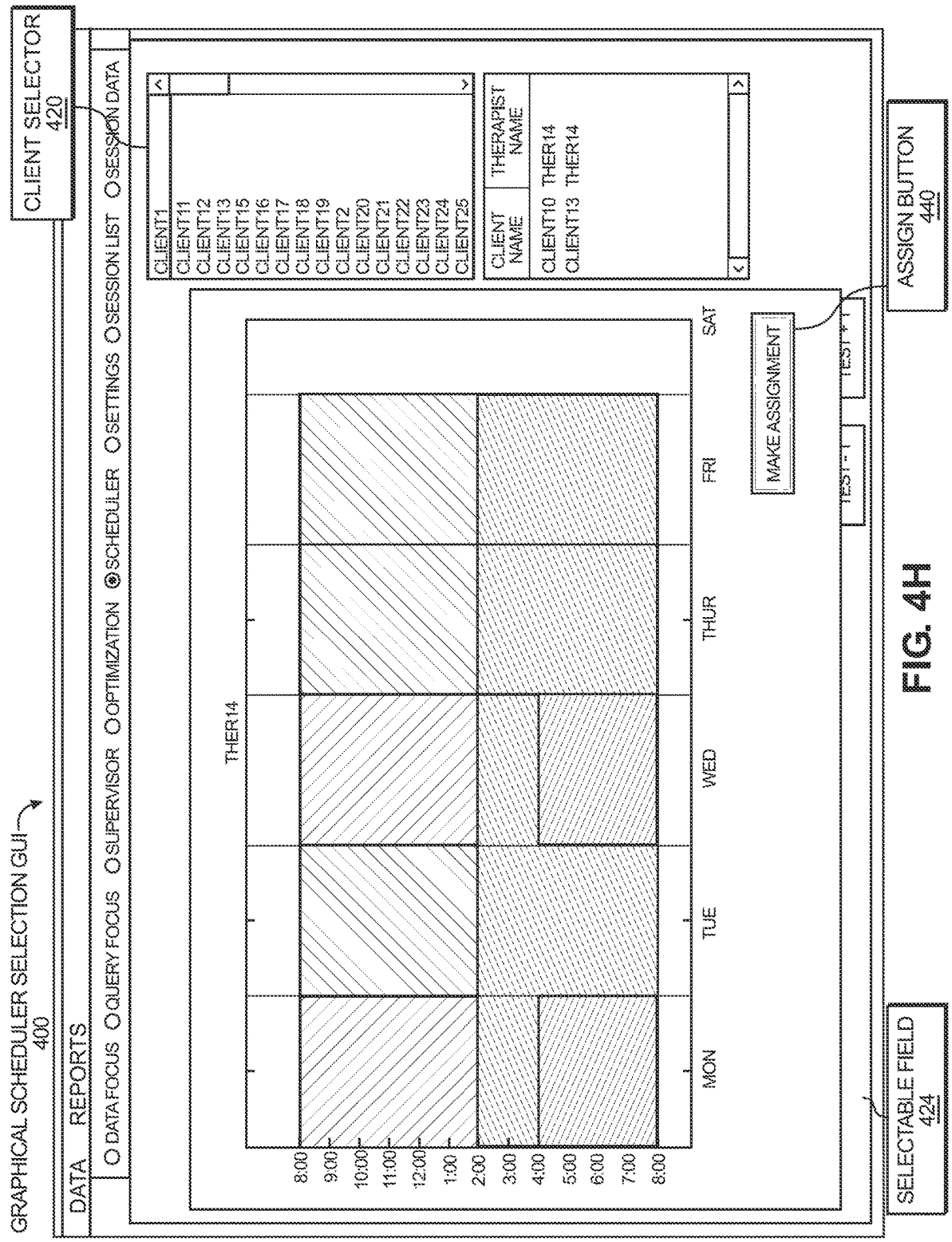
Figure 4I:
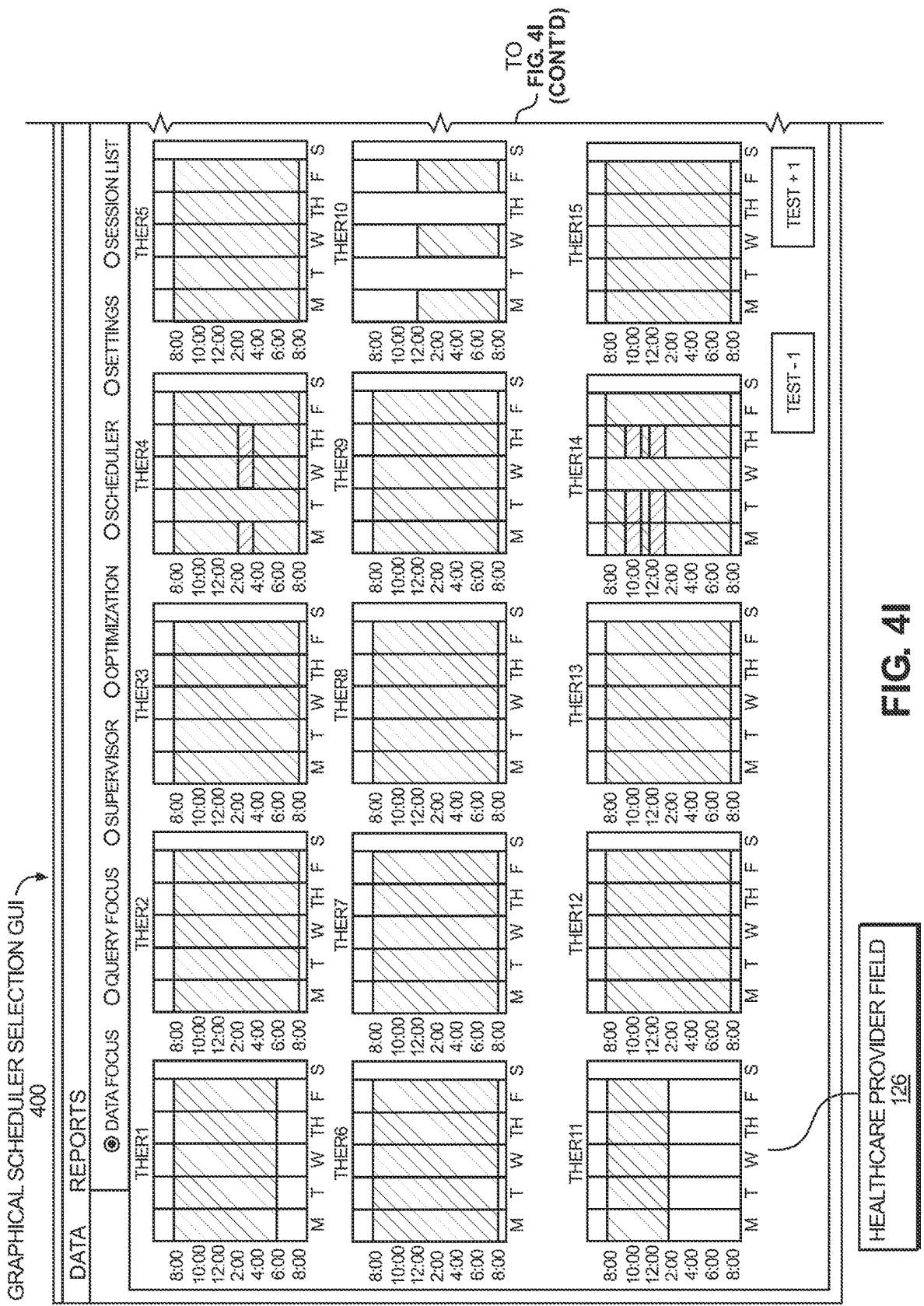

FIGS. 4H-4I illustrate another example of adding and assigning an additional client to healthcare provider similar to that represented in FIGS. 4B-G.

F. Automatic Scheduler

The following describes a function of the schedule generator automatically generating a full schedule using artificial intelligence.

1. Automatically Generate Schedule

Figure 5A:
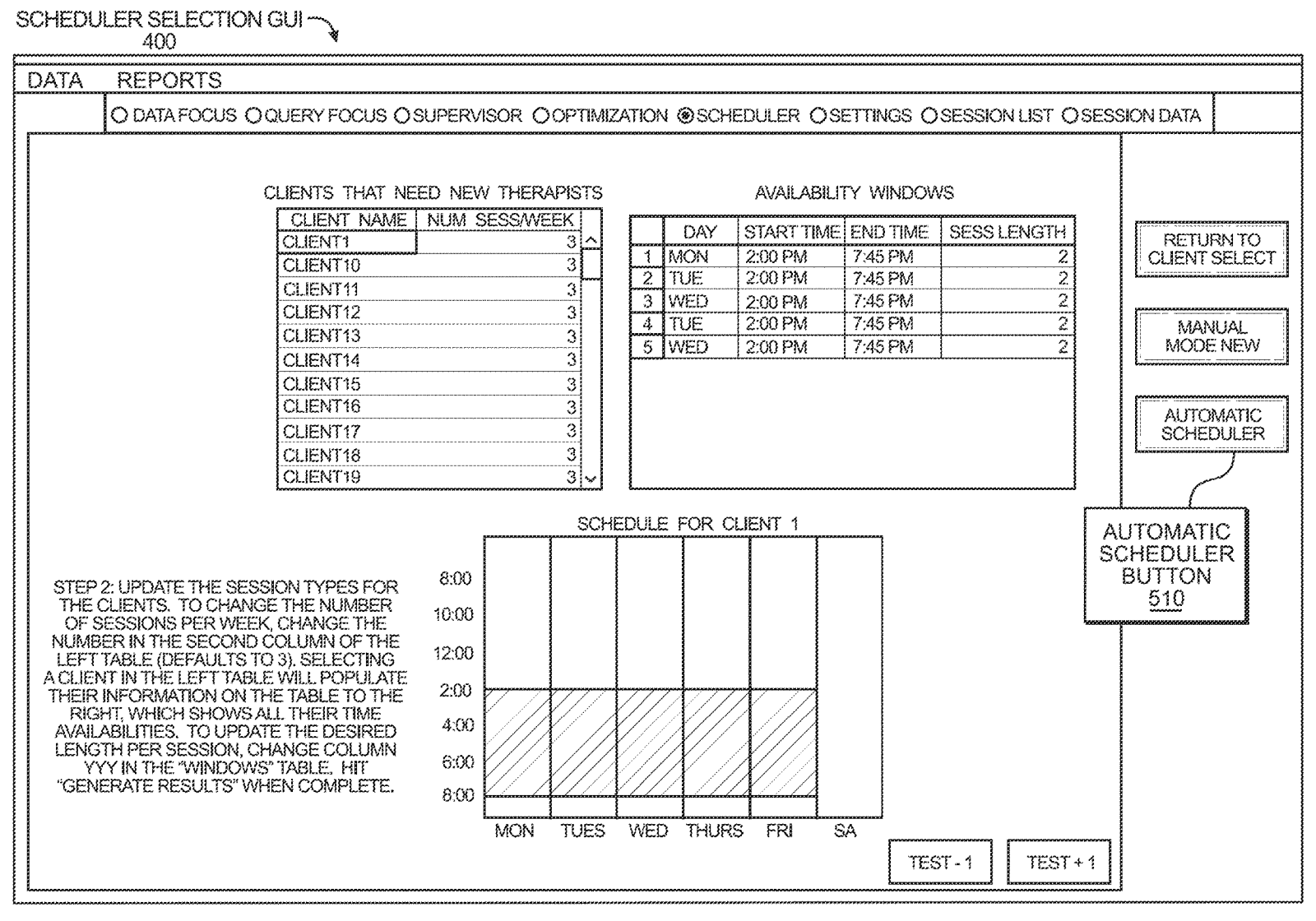
Figure 5B:
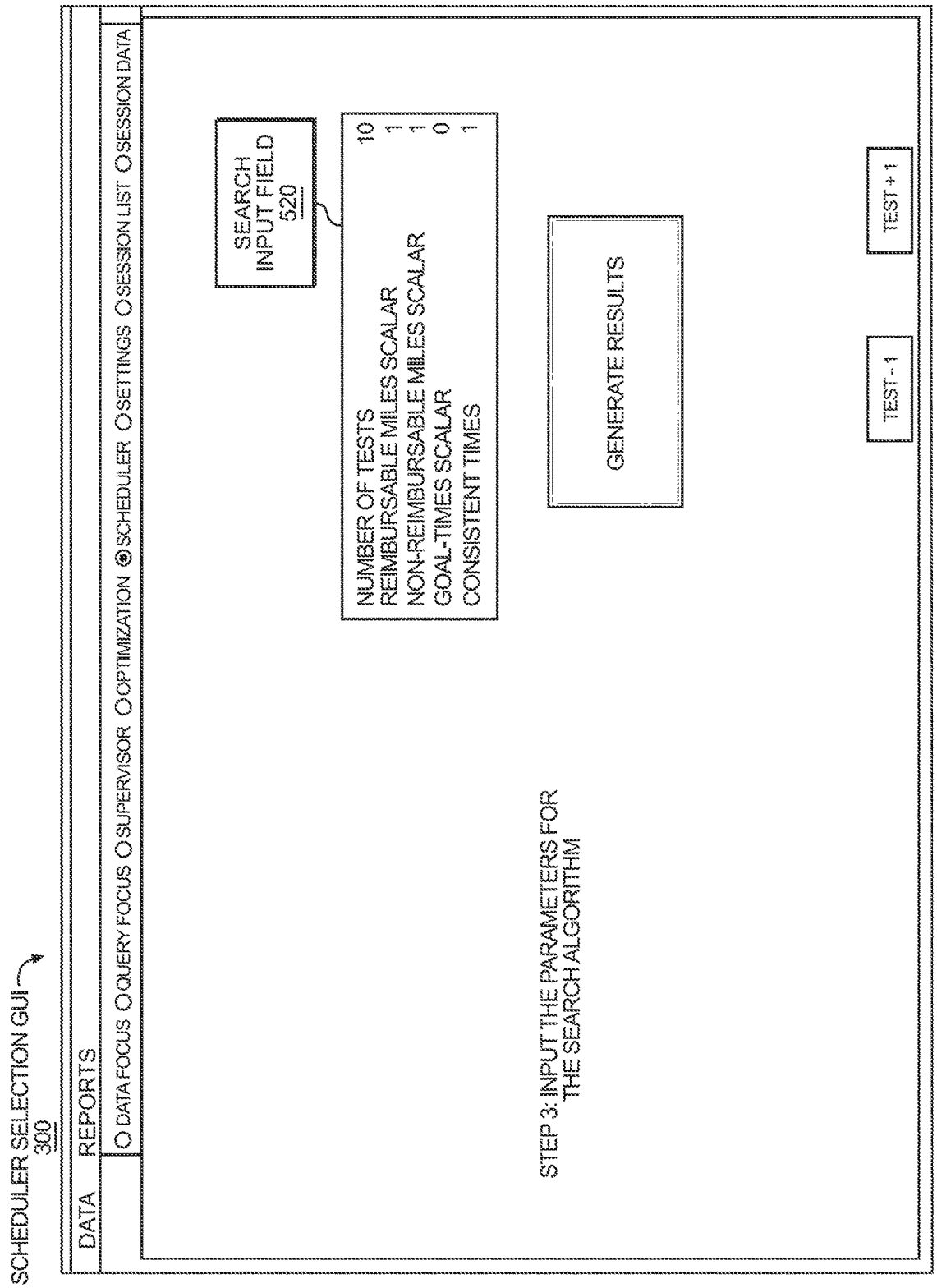

FIG. 5A-5B illustrate the display of scheduler selection GUI 300 in another implementation. In this example, scheduler selection GUI 300 is configured to generate a schedule programmatically among clients and healthcare providers. In this scheduler selection GUI 300, the user can generate a new schedule from the list of clients and healthcare providers between a client and a healthcare provider or among a number of clients and a number of healthcare providers all at once. The scheduler selection GUI 300 includes an automatic scheduler button 510.

In this example, at the step of configuring the clients who need to be assigned with new healthcare providers, instead of selecting manual mode for creating a schedule which displays the graphical scheduler selection GUI 400, of FIGS. 4A-4I, the user can select and click the automatic scheduler button 510, as illustrated in FIG. 5A.

As illustrated in FIG. 5B, when the user selects the automatic scheduler button 510 from the scheduler selection GUI 300, a search input field 520 will be displayed. The search input field 520 allows the user to input parameters that will be used to run an artificial intelligence program of the schedule generator and automatically generate a schedule without the user needing to manually, using graphical displays, assign the clients who need new healthcare providers. This artificial intelligence system is not limited to scheduling healthcare providers and clients. The artificial intelligence program can schedule any network of parties, places, or entities or combination thereof that needs to be scheduled with each other in a coordinated way.

Figure 5C:
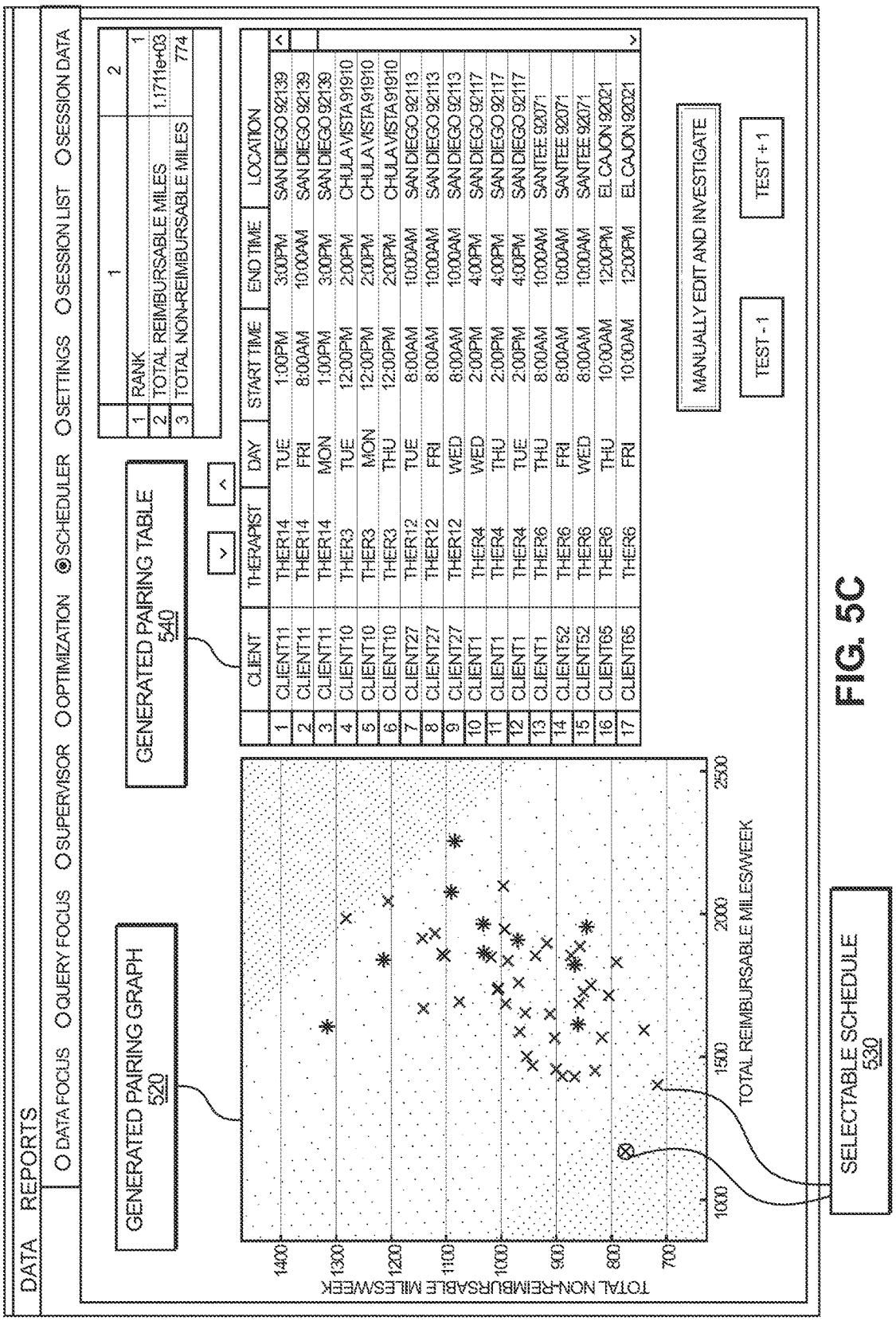

As illustrated in FIG. 5C, an automatic schedule selection GUI 500 is displayed including a generated pairing graph, a plurality of selectable schedules 530 and a generated pairing table 540 as a result of selecting the automatic generator function of the schedule selection GUI 300. In this example, the artificial intelligence program tests a number of different pairings and scenarios among the list of clients and healthcare providers selected and generates a table of potential configurations of sessions for all of the selected clients at once.

In this example, illustrated in FIG. 5C, fifty selectable schedules are generated and plotted with their associated total reimbursable miles against the total non-reimbursable miles in a scatter graph with a gradient background to aid in determining the schedules' performance, and the behavior of the gradient being defined by user inputs such as those from the Search Input Field 520 In one example, the user can select the selectable schedule 530 that represents the least number of reimbursable and non-reimbursable miles, effectively selecting the potential pairings with the least amount of total travel time (both reimbursable and non-reimbursable) among all of the client and healthcare provider sessions. When the particular selectable schedule 530 is selected, the generated pairing table 540 will list every pairing of client-healthcare provider sessions suggested by the configuration generated from the selected schedule 530. From this page, the user can manually edit each line item and components of each line item including, for example, start time, end time, day, client-healthcare provider pairings, and location for the session. In one example, the list in the generated pairing table can be sorted by different parameters. In this particular example, illustrated in FIG. 5C, drive time, reimbursable miles, client availabilities and session requirements, healthcare provider availabilities, and whether providers satisfy client requirements are taken into consideration by the artificial intelligence program in determining and generating the potential pairings and sessions.

2. Graphically View and Revise Schedule

Figure 6A:
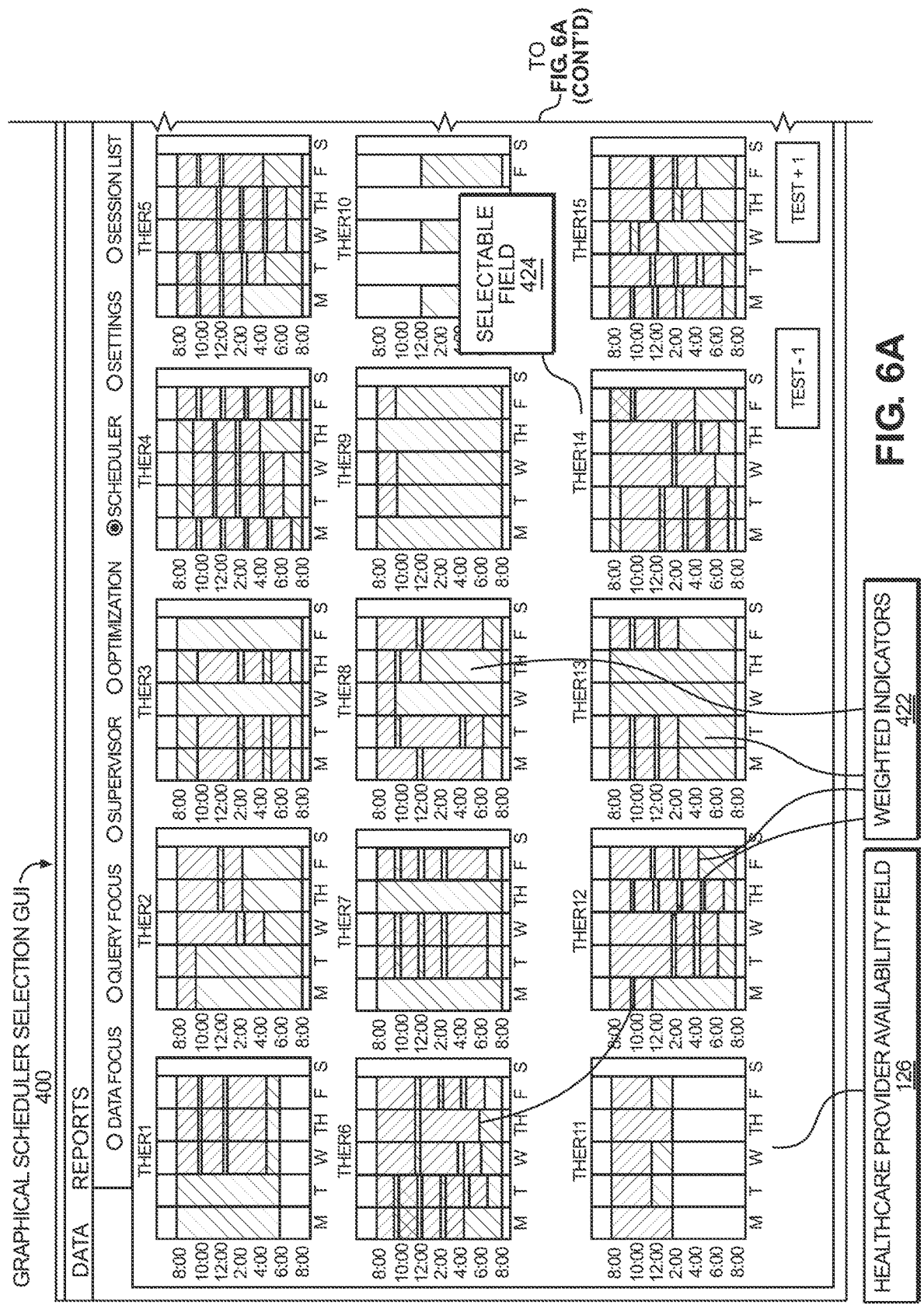
FIGS. 6A-6C show additional diagrams illustrating a graphical user interface that can be displayed on a display device for automatically generating a schedule according to some embodiments of the invention.
Figure 6B:
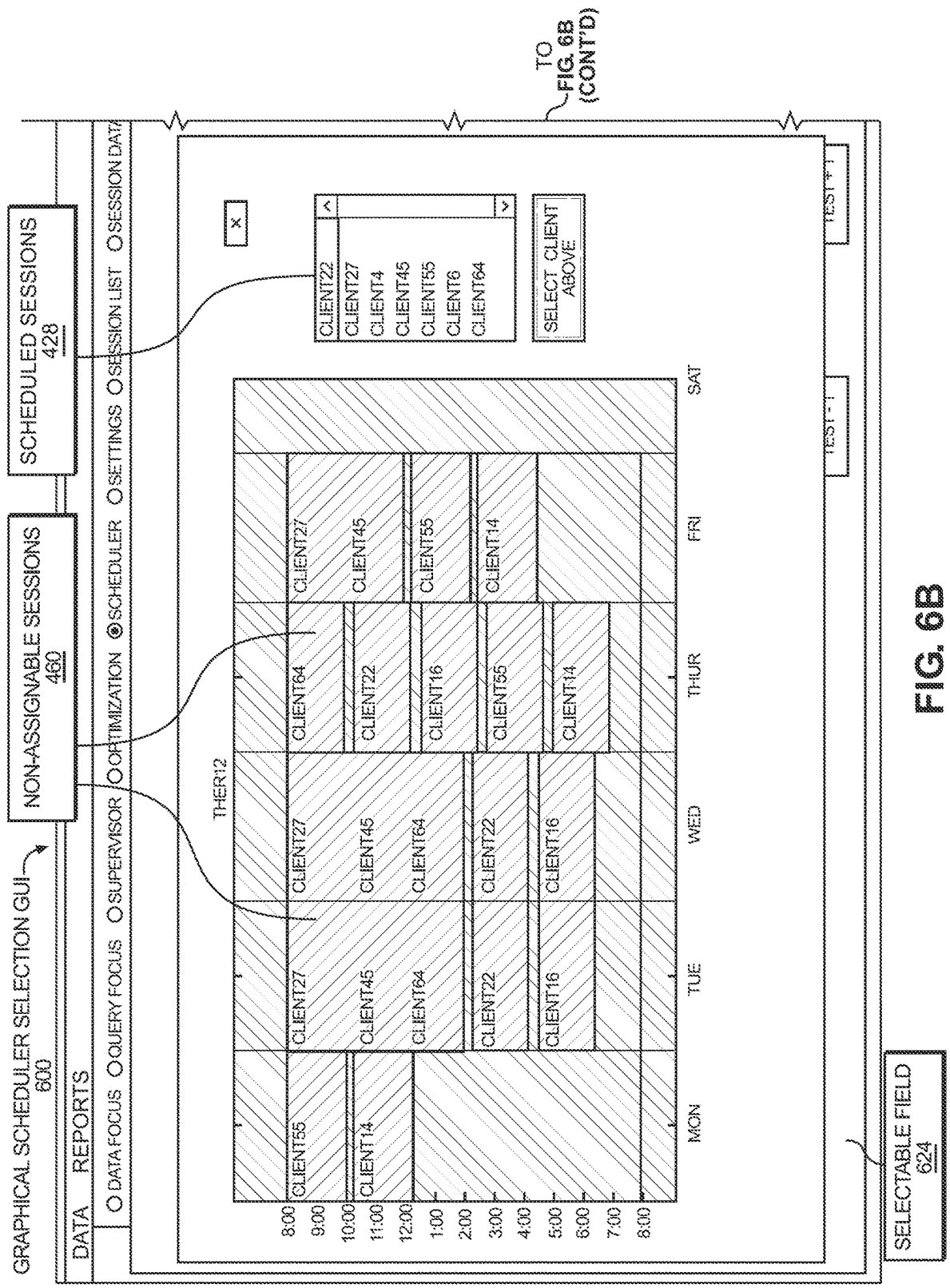
Figure 6C:
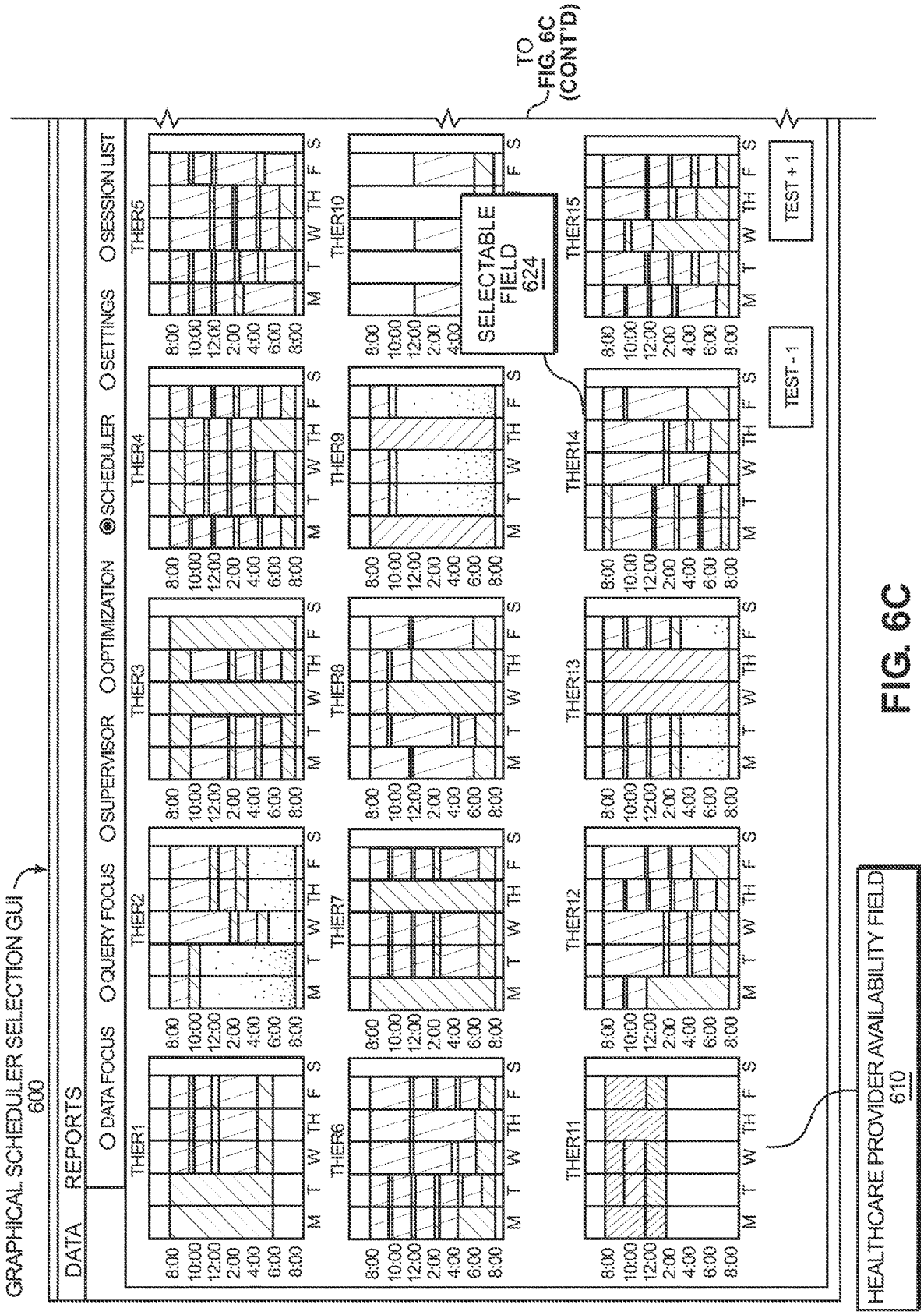
Figure 6C:
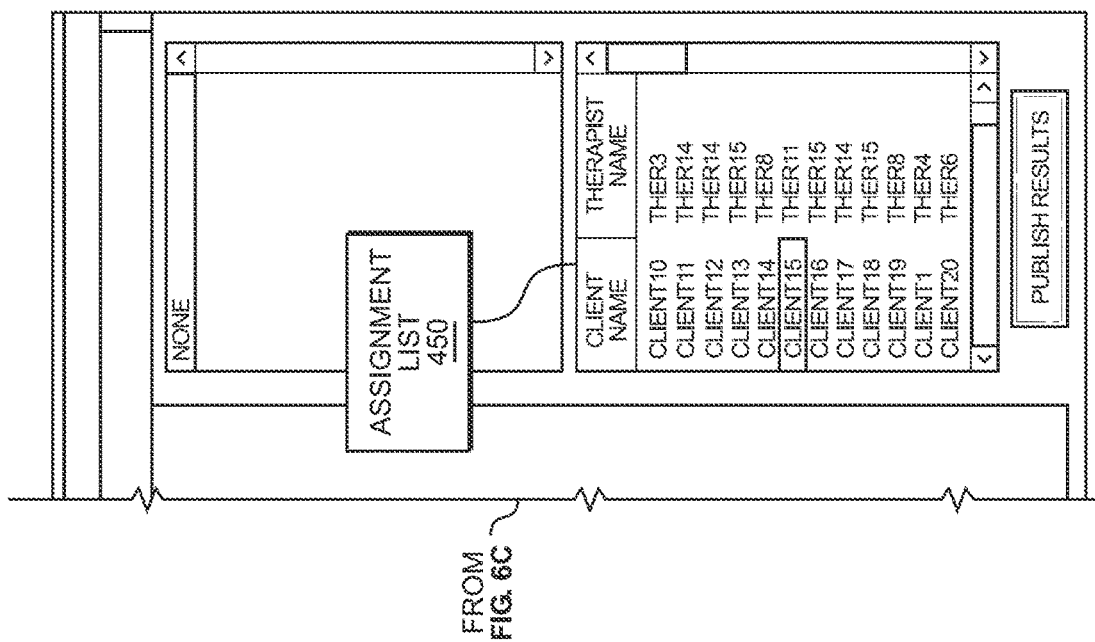

As illustrated in FIGS. 6A-6C, once the schedule is generated including all of the parings and session times, the user can select a "manually edit and investigate" button to view a graphical scheduler selection GUI 600 (similar to that of graphical scheduler selection GUI 400). In this GUI, as illustrated in FIG. 6A, instead of having to then select each client and use graphical indicators and rankings to manually assign each healthcare provider, all of the healthcare provider and client sessions are already booked without any conflicts in availability. This can be shown in assignment list 650 where the entire client list of the already paired assignment list is fully filled (contrast with that of FIG. 4B, where after the Manual Window View is formed, there are no client-healthcare provider pairings yet).

FIG. 6B illustrates a GUI having a selectable field 624 of a particular healthcare provider. The healthcare provider's calendar will already be filled with session marked graphically on the calendar. A scheduled sessions table will be displayed which lists all of the different clients listed on the calendar for this particular healthcare provider.

FIG. 6C illustrates a GUI including a display that graphically indicates potential reassignments from the automatically generated assignment from the schedule generator. In this example, the user can select a particular pairing between a client and a healthcare provider in the Assignment List 650. The graphical scheduler selection GUI 600 will update and include a healthcare provider availability field 610 with graphical representations of the currently paired healthcare provider with the client, and potentially different healthcare providers that can be reassigned. In one example, the potentially different healthcare providers that can be reassigned as graphically represented with rankings indicated in each selectable field 624 based on color codes.

Figure 7:
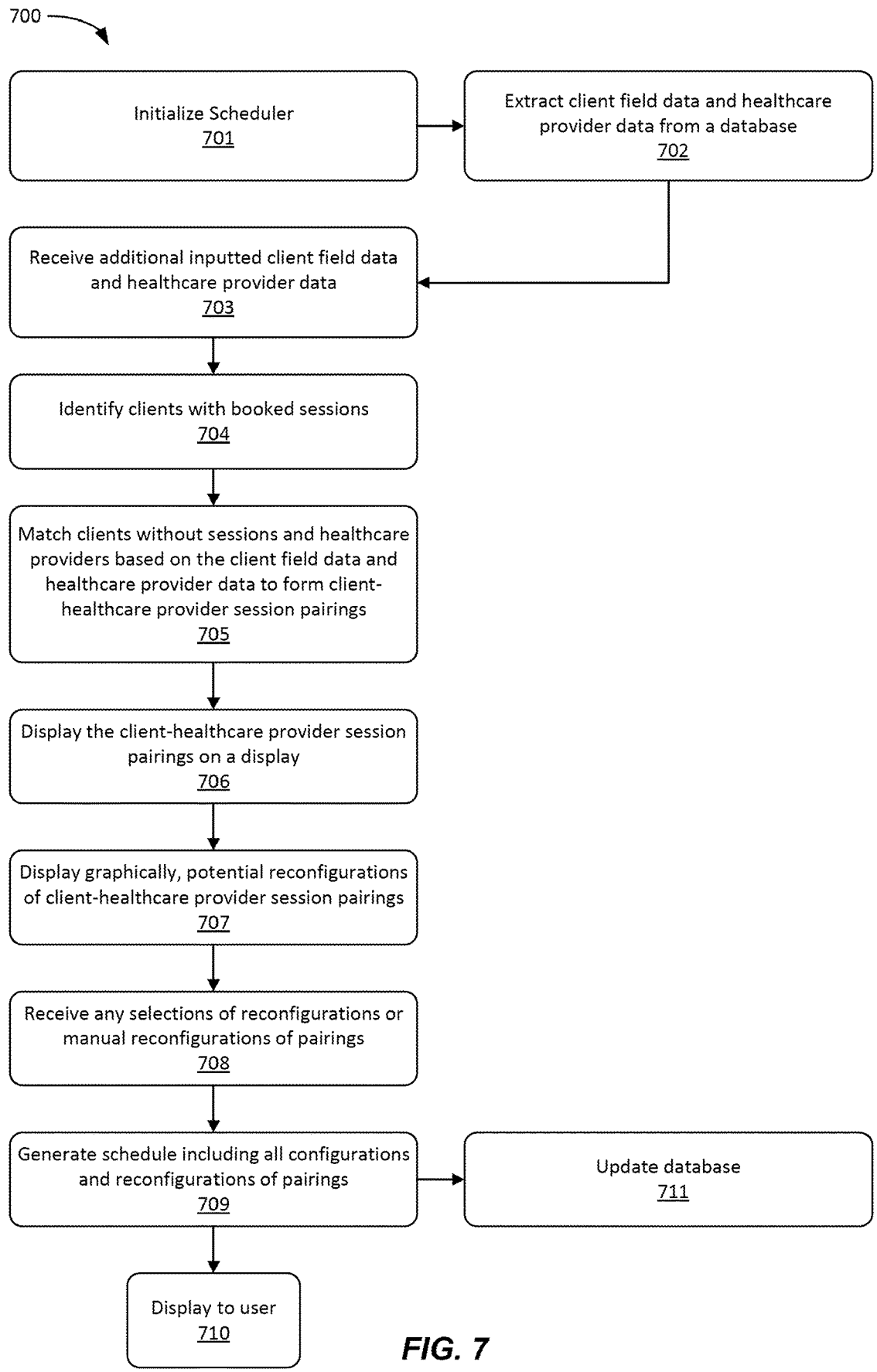
FIG. 7 shows a flowchart describing the method of generating a schedule of appointments according to some embodiments of the invention.

In the depicted example flow diagram 700 of FIG. 7, at block 701, the system can initialize a scheduler. At block 702, the system can extract client field data and healthcare provider data from a database. At block 703, the system can receive additional inputted client field data and healthcare provider data. At block 704, the system can identify clients with booked sessions. At block 705, the system can match clients without sessions and healthcare providers based on the client field data and healthcare provider data to form client-healthcare provider session pairings. At block 706, the system can display the client-healthcare provider sessions pairings on a display. At block 707, the system can display graphically, potential reconfigurations of client-healthcare provider sessions pairings. At block 708, the system can receive any selections of reconfigurations or manual reconfigurations of pairings. At block 709, the system can generate schedule including all configurations and reconfigurations of pairings. And the system, at block 710 and block 711, can display the information to a user, update a database, or a combination thereof.

G. Alternate Applications

As mentioned earlier, a schedule generator similar to that of the schedule generator above can be applied to other industries than healthcare. The scheduler can also be driven by artificial intelligence program similar to that discussed in previous sections of the specification.

For example, an automatic schedule generator can be applied to creating an errand schedule. The automatic schedule generator can retrieve data from an online database such as "Google Places" or "Google Maps" which aggregates stores and locations. From the database, the system can retrieve information about location, drive time, and times of operations for a particular day or week of the place. The scheduler system can then generate a schedule for a user or a group of people who need to accomplish multiple tasks by visiting different locations. In one example, the tasks can have rules such as having to be done by a certain time. The scheduler can generate a schedule which displays the different places and times to go to such places to handle the tasks. The tasks can include visiting stores for shopping, travelling to meetings, or other errands.

For example, if one of the tasks is visiting a grocery store which includes store name and amount of time needed to shop (this is inputted by the user, or the database already has this information), the scheduler can identify whether there are multiple locations or the same store or if multiple stores can satisfy the criteria from a shopping list, account for drive time to the different locations and determine the best location and schedule relative to other tasks. The automatic schedule generator can also calculate optimal times and locations for these tasks.

In another example, an automatic schedule generator can be applied to creating a schedule for delivery among a fleet of delivery drivers. The drivers can be the resources and the delivery locations can be the requirements (or locations that need servicing/delivery). The automatic schedule generator can determine the number of hours each driver can work, relative locations for each delivery point, and other factors, and determine a schedule for all of the drivers the most optimal schedule to distribute the deliveries in a given period of time, similar to that of the automatic schedule generator for the healthcare providers and clients.

In another example, the automatic schedule generator can be applied to a fleet of autonomous vehicles. The scheduler can automatically determine schedules and routes for an entire fleet for a given amount of time selected, such as a week. Each specific vehicle of the fleet would be assigned tasks based on parameters and criteria that need to be met.

Thus, the scheduler can be used for any application that includes a pool of individual data that include a variety of factors and criteria that have to be met and matched near-optimally with another pool of individual data that includes its own variety of factors and criteria that have to be met.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. The invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. The present invention may be practiced with different combinations of the features in each described configuration.

The terminology used herein is for the purpose of describing particular aspects only and is not intended to be limiting of the disclosure. As used herein, the singular forms "a," "an," and "the" are intended to comprise the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method for generating a graphical user interface configured to display, at least in part, a schedule, the method comprising:
    displaying a graphical user interface having a first portion and a second portion, the first portion including one or more selectable fields of one or more providers and a provider availability graph, the second portion including one or more selectable fields of a client and a client availability graph;
    receiving an input for the one or more selectable fields of a provider;
    in response to receive the input for the one or more selectable fields, displaying an availability of the provider via the provider availability graph, wherein the provider availability graph displays time-based schedule of appointments with multiple clients;
    receiving an input for one or more selectable fields of the client;
    in response to receiving the input of the one or more selection fields of the client, displaying an availability of the client via the client availability graph;
    determining pairings between the client and each of the one or more providers based on the one or more selectable fields of the client and the one or more selectable fields of the one or more providers from the plurality of providers;
    scoring pairings between the client and each of the one or more providers based on the one or more selectable fields of the client and the one or more selectable fields of the one or more providers from the plurality of providers;
    generating a schedule of one or more potential sessions between the client and a first provider from the plurality of providers based on the scored pairings;
    displaying the schedule on the graphical user interface;
    displaying, via the graphical user interface, a rule selector for the selection of a plurality of algorithms used to optimize scheduling;
    displaying, via the first portion of the graphical user interface, the client availability graph; and displaying, via the second portion of the graphical user interface, a provider availability graph.

2. The method of claim 1, further comprising:
displaying an optimization graphical user interface comprising a rule selector for the selection of an optimization algorithm from a plurality of algorithms;
receiving a selection of one of the algorithms from the plurality of algorithms; and
based on the selected algorithm, optimizing the schedule of the provider.

3. The method of claim 2, further comprising:
displaying via the optimization graphical user interface further comprising a target metric selector for the selection of a target metric from a plurality of target metrics;
receiving a selection of a target metric; and
based on the selection of the target metric, optimizing the schedule of the provider.

4. The method of claim 3, further comprising:
displaying, via the first portion of the graphical user interface, the client availability graph with the optimized schedule.

5. The method of claim 1, further comprising:
scoring pairings between the client and each of the one or more providers; and
generating a schedule for one or more potential sessions between the client and a provider from the plurality of providers based on the scored pairings.

6. The method of claim 1, further comprising:
generating a schedule for one or more potential sessions between the client and the provider, wherein the schedule includes multiple sessions based on a default predetermined number of sessions with a default session length.

7. Non-transitory computer storage that stores executable program instructions that, when executed by one or more computing devices, configure the one or more computing devices to perform operations comprising:
displaying a graphical user interface having a first portion and a second portion, the first portion including one or more selectable fields of one or more providers and a provider availability graph, the second portion including one or more selectable fields of a client and a client availability graph;
receiving an input for the one or more selectable fields of a provider;
in response to receive the input for the one or more selectable fields, displaying an availability of the provider via the provider availability graph, wherein the provider availability graph displays time-based schedule of appointments with multiple clients;
receiving an input for one or more selectable fields of the client;
in response to receiving the input of the one or more selection fields of the client, displaying an availability of the client via the client availability graph;
determining pairings between the client and each of the one or more providers based on the one or more selectable fields of the client and the one or more selectable fields of the one or more providers from the plurality of providers;
scoring pairings between the client and each of the one or more providers based on the one or more selectable fields of the client and the one or more selectable fields of the one or more providers from the plurality of providers;

generating a schedule of one or more potential sessions between the client and a first provider from the plurality of providers based on the scored pairings;
displaying the schedule on the graphical user interface;
displaying, via the graphical user interface, a rule selector for the selection of a plurality of algorithms used to optimize scheduling;
displaying, via the first portion of the graphical user interface, the client availability graph; and
displaying, via the second portion of the graphical user interface, a provider availability graph.

8. The non-transitory computer storage of claim 7, wherein the operations further comprise:
displaying an optimization graphical user interface comprising a rule selector for the selection of an optimization algorithm from a plurality of algorithms;
receiving a selection of one of the algorithms from the plurality of algorithms; and
based on the selected algorithm, optimizing the schedule of the provider.

9. The non-transitory computer storage of claim 8, wherein the operations further comprise:
displaying via the optimization graphical user interface further comprising a target metric selector for the selection of a target metric from a plurality of target metrics;
receiving a selection of a target metric; and
based on the selection of the target metric, optimizing the schedule of the provider.

10. The non-transitory computer storage of claim 1, wherein the operations further comprise:
displaying, via the first portion of the graphical user interface, the client availability graph with the optimized schedule.

11. The non-transitory computer storage of claim 7, wherein the operations further comprise:
scoring pairings between the client and each of the one or more providers; and
generating a schedule for one or more potential sessions between the client and a provider from the plurality of providers based on the scored pairings.

12. The non-transitory computer storage of claim 7, wherein the operations further comprise:
generating a schedule for one or more potential sessions between the client and the provider, wherein the schedule includes multiple sessions based on a default predetermined number of sessions with a default session length.

13. A system comprising one or more non-transitory computer-readable media storing computer-executable instructions that, when executed on one or more processors, cause the one or more processors to perform operations comprising:
displaying a graphical user interface having a first portion and a second portion, the first portion including one or more selectable fields of one or more providers and a provider availability graph, the second portion including one or more selectable fields of a client and a client availability graph;
receiving an input for the one or more selectable fields of a provider;
in response to receive the input for the one or more selectable fields, displaying an availability of the provider via the provider availability graph, wherein the provider availability graph displays time-based schedule of appointments with multiple clients;

receiving an input for one or more selectable fields of the client;

in response to receiving the input of the one or more selection fields of the client, displaying an availability of the client via the client availability graph;

determining pairings between the client and each of the one or more providers based on the one or more selectable fields of the client and the one or more selectable fields of the one or more providers from the plurality of providers;

scoring pairings between the client and each of the one or more providers based on the one or more selectable fields of the client and the one or more selectable fields of the one or more providers from the plurality of providers;

generating a schedule of one or more potential sessions between the client and a first provider from the plurality of providers based on the scored pairings;

displaying the schedule on the graphical user interface;

displaying, via the graphical user interface, a rule selector for the selection of a plurality of algorithms used to optimize scheduling;

displaying, via the first portion of the graphical user interface, the client availability graph; and displaying, via the second portion of the graphical user interface, a provider availability graph.

14. The system of claim 13, further comprising the operations of:

displaying an optimization graphical user interface comprising a rule selector for the selection of an optimization algorithm from a plurality of algorithms;

receiving a selection of one of the algorithms from the plurality of algorithms; and based on the selected algorithm, optimizing the schedule of the provider.

15. The system of claim 14, further comprising the operations of:

displaying via the optimization graphical user interface further comprising a target metric selector for the selection of a target metric from a plurality of target metrics;

receiving a selection of a target metric; and based on the selection of the target metric, optimizing the schedule of the provider.

16. The system of claim 15, further comprising the operations of:

displaying, via the first portion of the graphical user interface, the client availability graph with the optimized schedule.

17. The system of claim 13, further comprising the operations of:

generating a schedule for one or more potential sessions between the client and the provider, wherein the schedule includes multiple sessions based on a default predetermined number of sessions with a default session length.

* * * * *